US010290389B2

(12) United States Patent
Wu et al.

(10) Patent No.: US 10,290,389 B2
(45) Date of Patent: May 14, 2019

(54) THERMOPLASTIC COMPOSITIONS CONTAINING NANOSCALE-SIZED PARTICLE ADDITIVES FOR LASER DIRECT STRUCTURING AND METHODS FOR THE MANUFACTURE AND USE THEREOF

(71) Applicant: SABIC Global Technologies B.V., Bergen op Zoom (NL)

(72) Inventors: Tong Wu, Shanghai (CN); Yunan Cheng, Shanghai (CN); Yangang Yan, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/982,790

(22) Filed: May 17, 2018

(65) Prior Publication Data
US 2018/0268955 A1 Sep. 20, 2018

Related U.S. Application Data

(63) Continuation of application No. 14/160,168, filed on Jan. 21, 2014, now abandoned.

(60) Provisional application No. 61/755,232, filed on Jan. 22, 2013.

(51) Int. Cl.
| H01B 3/42 | (2006.01) |
| H01B 3/30 | (2006.01) |
| C08L 69/00 | (2006.01) |
| C08L 77/02 | (2006.01) |
| C08L 77/06 | (2006.01) |
| C08K 3/34 | (2006.01) |
| C08K 5/523 | (2006.01) |
| C08K 5/5399 | (2006.01) |
| C08K 9/02 | (2006.01) |
| C08L 83/10 | (2006.01) |
| C08K 3/013 | (2018.01) |
| C08L 55/02 | (2006.01) |

(52) U.S. Cl.
CPC ............ *H01B 3/426* (2013.01); *C08K 3/013* (2018.01); *C08K 3/34* (2013.01); *C08K 5/523* (2013.01); *C08K 5/5399* (2013.01); *C08K 9/02* (2013.01); *C08L 69/00* (2013.01); *C08L 77/02* (2013.01); *C08L 77/06* (2013.01); *C08L 83/10* (2013.01); *H01B 3/303* (2013.01); *C08L 55/02* (2013.01)

(58) Field of Classification Search
CPC .......... C08L 69/00; C08L 77/02; C08L 77/06; C08L 55/02; C08L 2666/14; C08K 3/22; H01B 3/303; H01B 3/426
See application file for complete search history.

(56) References Cited

U.S. PATENT DOCUMENTS

| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,511,895 A | 5/1970 | Kydomieus |
| 3,981,944 A | 9/1976 | Okamoto et al. |
| 4,174,358 A | 11/1979 | Epstein |
| 4,217,438 A | 8/1980 | Brunelle et al. |
| 4,251,644 A | 2/1981 | Joffrion |
| 4,346,194 A | 8/1982 | Roura |
| 4,474,927 A | 10/1984 | Novak |
| 4,548,997 A | 10/1985 | Mellinger et al. |
| 4,629,759 A | 12/1986 | Rock |
| 4,746,701 A | 5/1988 | Kress et al. |
| 4,816,527 A | 3/1989 | Rock |
| 5,414,045 A | 5/1995 | Sue et al. |
| 6,310,145 B1 | 10/2001 | Puyenbroek et al. |
| 6,331,584 B1 | 12/2001 | Nordera et al. |
| 6,787,575 B1 | 9/2004 | Fichou et al. |
| 6,949,596 B2 | 9/2005 | Seidel et al. |
| 6,964,746 B2 | 11/2005 | Schlosser et al. |
| 7,230,066 B2 | 6/2007 | Khouri et al. |
| 7,928,168 B2 | 4/2011 | Li et al. |

(Continued)

FOREIGN PATENT DOCUMENTS

| CN | 101068884 A | 11/2007 |
| CN | 101233192 A | 7/2008 |

(Continued)

OTHER PUBLICATIONS

Lyu et al. "Study of Mechanical and Rheological Behaviors of Linear and Branched Polycarbonates Blends", Journal of Applied Polymer Science, 80, pp. 1814-1824, Jun. 2001. (Year: 2001).*

(Continued)

*Primary Examiner* — Christopher M Rodd
(74) *Attorney, Agent, or Firm* — Baker Hostetler LLP

(57) ABSTRACT

This invention relates generally to a thermoplastic compositions and, more particularly, to compositions comprising a polymer matrix and comprising a filler composition. To that end, according to the aspects of the invention, a thermoplastic composition is disclosed that generally comprises a polymer matrix and at least one filler composition. The polymer matrix generally comprises at least one polycarbonate or polyamide. The filler composition generally comprises at least one laser direct structuring additive with a mean particle size of less than 1 μm and may additionally optionally comprise flame retardants, stabilizers and process aids.

25 Claims, 1 Drawing Sheet

(56) References Cited

U.S. PATENT DOCUMENTS

| | | | |
|---|---|---|---|
| 8,017,697 B2 | 9/2011 | Carrillo et al. | |
| 2005/0164022 A1 | 7/2005 | Kliesch et al. | |
| 2006/0074165 A1* | 4/2006 | Gelissen | B41M 5/267 |
| | | | 524/430 |
| 2007/0049706 A1 | 3/2007 | Siripurapu et al. | |
| 2008/0311207 A1 | 12/2008 | Varshney et al. | |
| 2009/0036593 A1* | 2/2009 | Derudder | C08L 55/02 |
| | | | 524/506 |
| 2009/0048373 A1* | 2/2009 | Clauss | B41M 5/267 |
| | | | 524/86 |
| 2009/0209697 A1 | 8/2009 | Persigehl et al. | |
| 2010/0021842 A1 | 1/2010 | Kanga | |
| 2013/0143994 A1 | 6/2013 | Van Hartingsveldt et al. | |
| 2014/0002311 A1 | 1/2014 | Takano et al. | |
| 2014/0194561 A1 | 7/2014 | Ganguly et al. | |
| 2014/0275372 A1 | 9/2014 | He et al. | |

FOREIGN PATENT DOCUMENTS

| | | | |
|---|---|---|---|
| CN | 101784607 A | 7/2010 | |
| CN | 101809085 A | 8/2010 | |
| CN | 102770491 A | 11/2012 | |
| CN | 102796372 | 11/2012 | |
| EP | 2335936 | 6/2011 | |
| EP | 2390282 | 11/2011 | |
| EP | 2703435 A1 | 3/2014 | |
| WO | WO 2009/024496 A2 | 2/2009 | |
| WO | WO-2009024496 A2 * | 2/2009 | C08L 51/00 |
| WO | WO 2009/141799 A1 | 11/2009 | |
| WO | WO 2011/076729 A1 | 6/2011 | |
| WO | WO 2012/128219 | 9/2012 | |

OTHER PUBLICATIONS

Holding, Molecular Weight Characterization of Synthetic Polymers, p. 16, 1995. (Year: 1995).*

Nanoarc Nanophase Metal Oxide Technology, May 19, 2015. (Year: 2015).*

Lyu et al.; "Study of Mechanical and Rheological Behaviors of Linear and Branched Polycarbonates Blends"; Journal of Applied Polymer Science; vol. 80; Jun. 2001; p. 1814-1824.

Holding Molecular Weight Characterization of Synthetic Polymers; 16; 1995.

DuPont Ti-Pure Titanium Dioxide Technical Brochure; Dec. 2007.

Grivory G 21 Technical Data Sheet, Sep. 11, 2015.

Nanoarc Nanophase Metal Oxide Technology; May 19, 2015.

International Patent Application No. PCT/IB2014/058472; Int'l Preliminary Report on Patentability; dated Jul. 28, 2015; 7 pages.

* cited by examiner

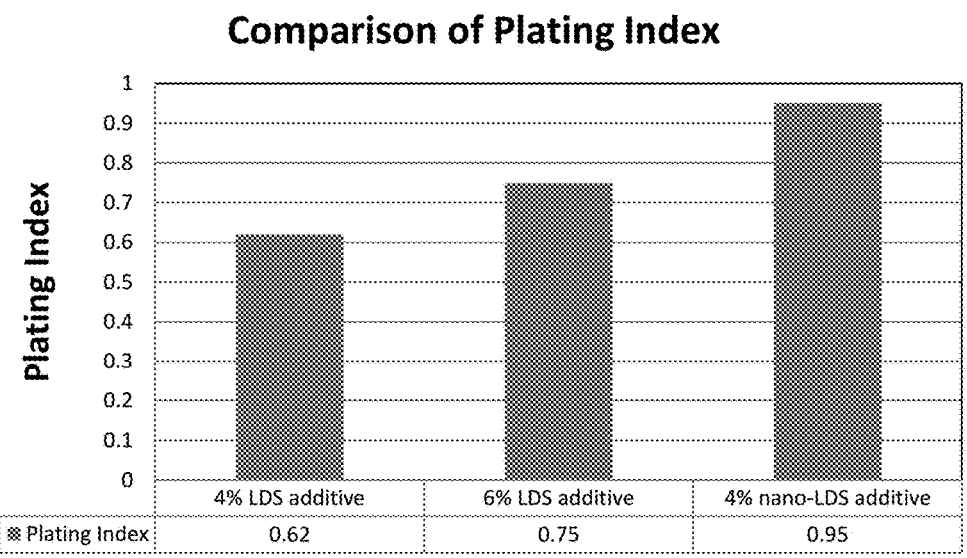
Comparison of Plating Index of mean particle size and loading for LDS additives

THERMOPLASTIC COMPOSITIONS CONTAINING NANOSCALE-SIZED PARTICLE ADDITIVES FOR LASER DIRECT STRUCTURING AND METHODS FOR THE MANUFACTURE AND USE THEREOF

CROSS REFERENCE TO RELATED PATENT APPLICATION

This application claims priority to U.S. Ser. No. 14/160,168, filed on Jan. 21, 2014, which claims priority to U.S. Patent Application No. 61/755,232 filed Jan. 22, 2013, the entire contents of both of which are hereby incorporated by reference herein.

BACKGROUND OF THE INVENTION

Electrical components can be provided as molded injection devices (MID) with desired printed conductors. In contrast to conventional circuit boards made of fiberglass-reinforced plastic or the like, MID components manufactured in this way are three-dimensional (3D) molded parts having an integrated printed conductor layout and possibly further electronic or electromechanical components. The use of MID components of this type, even if the components have only printed conductors and are used to replace conventional wiring inside an electrical or electronic device, saves space, allowing the relevant device to be made smaller. It also lowers the manufacturing costs by reducing the number of assembly and contacting steps. These MID devices have great utility in cell phones, PDAs and notebook applications.

Stamp metal, flexible printed circuit board (FPCB) mounted and two-shot molding methods are three existing technologies to make an MID. However, stamping and FPCB mounted process have limitations in the pattern geometry, and the tooling is expensive. Also, altering of a RF pattern causes high-priced and time-consuming modifications in tooling. 2-shot-molding (two-component injection molding) processes have also been used to produce 3D-MIDs with real three-dimensional structures. For example, an antenna can be formed by subsequent chemical corrosion, chemical surface activation and selective metal coating. This method involves relatively high initial costs and is only economically viable for large production numbers. 2-shot-molding is also not regarded as an environmentally friendly process. All of these three methods are tool-based technologies, which have limited flexibility, long development cycles, difficult prototype, expensive design changes, and limited ability to produce miniaturization. Accordingly, it is becoming increasingly popular to form MIDs using a laser direct structuring (LDS) process. In an LDS process a computer-controlled laser beam travels over the MID to activate the plastic surface at locations where the conductive path is to be situated.

Laser-supported or directed structuring process (LDS) for 3D MIDs simplifies the manufacturing process. Simplifying the miniaturization process, the laser, with possible resolutions of less than 0.1 mm, may produce fine structures and remove material from plastic surfaces with precision and selectivity. For example, the LDS process allows for antenna structures to be directly and cost effectively integrated into a cell phone housing. Further, the LDS process allows for sophisticated mechatronic systems that integrate mechanical and electrical properties for automotive and medical applications. With a laser direct structuring process, it is also possible to obtain small conductive path widths (such as 150 microns or less). In addition, the spacing between the conductive paths can also be small. As a result, MIDs formed from this process can save space and weight in end-use applications. Another advantage of laser direct structuring is its flexibility. If the design of the circuit is to be changed, it is simply a matter of reprogramming the computer that controls the laser.

In a conventional LDS process, a thermoplastic composition can be doped with a metal containing LDS additive such that it can be activated by a laser. The laser beam can then be used to activate the LDS additive forming a micro-rough track on the surface. The metal particles from the LDS additive present on the surface of the micro-rough track can in turn form nuclei for the subsequent metallization. However, due to different chemical plating solutions and conditions used, the plating performance of conventional LDS materials can vary in ways such as plating rate and adhesion of plating layers. In addition, some LDS fillers have a surface pH that may be detrimental to the polymer matrix during processing, resulting in degradation of the polymers, and further influencing the mechanical properties and long term stability of the composites. This polymer matrix degradation leads to, for example, decreased ductility for the final composition. The changed ductility, along with and other property changes, may result in substantial, and potentially undesirable, changes in the material's overall properties.

Lower loading of LDS additive can provide better impact performance, but sacrifices plating performance due to the absence of enough LDS activation. Conversely, in order to maintain adequate plating performance, sufficient LDS additive is necessary. Accordingly, it would be beneficial to provide a LDS blended thermoplastic composition (or LDS compound) having good plating performance while maintaining good mechanical performance. It would also be beneficial to provide a LDS blended thermoplastic composition that is capable of being used in various applications due to the ability of the composition to provide good mechanical performance. It would also be beneficial to provide a thermoplastic composition that is capable of being used in a laser direct structuring process. This and other needs are satisfied by the various aspects of the present disclosure.

SUMMARY OF THE INVENTION

This disclosure relates generally to thermoplastic compositions suitable for use in laser direct structuring processes. More particularly, according to aspects of the disclosure, thermoplastic compositions are provided that generally comprises a thermoplastic polymer component and a laser direct structuring additive component, wherein the laser direct structuring additive comprises a particulate material having a mean particle size of equal to or less than 1 μm.

In one exemplary aspect, a polymer composition is disclosed comprising: a) a first polycarbonate polymer; and b) a laser direct structuring additive, wherein the laser direct structuring additive comprises a mean particle size of equal to or less than 1 μm.

In another exemplary aspect, a polymer composition is disclosed comprising: a) a polyamide polymer; and b) a laser direct structuring additive; wherein the laser direct structuring additive comprises a mean particle size of equal to or less than 1 μm.

In yet another exemplary aspect, a polymer composition is disclosed comprising: a) a thermoplastic polymer; and b)

a laser direct structuring additive, wherein the laser direct structuring additive comprises a mean particle size of equal to or less than 1 µm.

Also disclosed are methods of manufacturing the disclosed compositions and articles of manufacture comprising the disclosed compositions. For example, according to exemplary aspects a method for the manufacture of a disclosed thermoplastic composition is provided generally comprising the steps of a) providing a thermoplastic polymer component; b) providing a laser direct structuring additive having a mean particle size of equal to or less than 1 µm; and c) combining or blending the thermoplastic polymer component and the laser direct structuring additive to form a polymer composition.

In one exemplary aspect, a method is provided for the manufacture of a polymer composition, comprising the steps of: a) providing a first polycarbonate polymer; b) providing a laser direct structuring additive having a mean particle size of equal to or less than 1 µm; and c) combining the first polycarbonate polymer and laser direct structuring additive to form a polymer composition.

In another exemplary aspect, a method is provided for the manufacture of a polymer composition, comprising the steps of: a) providing a polyamide polymer; b) providing a laser direct structuring additive having a mean particle size of equal to or less than 1 µm; and; c) combining the polyamide polymer and laser direct structuring additive to form a polymer composition.

Other advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate several aspects as described below.

FIG. 1 shows a comparison between the plating index obtained using a standard conventional LDS additive with either 4% or 6% loading compared to the plating index obtained from an inventive composition comprising an LDS additive with a nano-sized mean particle size at 4% loading.

DETAILED DESCRIPTION OF THE INVENTION

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are component materials to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "carbonyl group" as used herein is represented by the formula C=O.

As used herein, the terms "number average molecular weight" or "Mn" can be used interchangeably, and refer to the statistical average molecular weight of all the polymer chains in the sample and is defined by the formula:

$$Mn = \frac{\Sigma N_i M_i}{\Sigma N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\Sigma N_i M_i^2}{\Sigma N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of about 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

The terms "polycarbonate" or "polycarbonates" as used herein includes copolycarbonates, homopolycarbonates and (co)polyester carbonates.

The terms "residues" and "structural units", used in reference to the constituents of the polymers, are synonymous throughout the specification.

The term "ABS" or "acrylonitrile-butadiene-styrene copolymer" as used herein refers to an acrylonitrile-butadiene-styrene polymer which can be an acrylonitrile-butadiene-styrene terpolymer or a blend of styrene-butadiene rubber and styrene-acrylonitrile copolymer.

The term "impact modifier" as used herein refers to a component of the disclosed thermoplastic compositions wherein the impact modifier is a polymeric material effective in improving the impact properties of the disclosed thermoplastic compositions, e.g. the notched Izod impact strength of the composition. As used herein, an impact modifier can be a one or more polymers such as acrylonitrile butadiene styrene copolymer (ABS), methacrylate butadiene styrene copolymer (MBS), and/or bulk polymerized ABS (BABS).

Each of the component materials disclosed herein are either commercially available and/or the methods for the production thereof are known to those of ordinary skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Thermoplastic Compositions

As summarized above, the disclosure provides improved thermoplastic compositions that are particularly useful in connection with laser direct structuring (LDS) technology. For example, as described in greater detail below, aspects of the disclosure provide thermoplastic compositions that are capable of being used in a laser direct structuring (LDS) process and that provide enhanced plating performance while exhibiting relatively good mechanical properties. To that end, the disclosed thermoplastic compositions generally comprise a blend of a thermoplastic polymer resin and a laser direct structuring additive comprising a mean particle size equal to or less than 1 μm. The disclosed thermoplastic composition can further optionally comprise one or more additional additives.

The disclosed thermoplastic composition disclosed herein provides robust plating performance, while maintaining good mechanical properties (e.g., Izod impact strength higher than about 400 J/m). Evaluation of the mechanical properties can be performed through various tests, such as Izod test, Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

The disclosed thermoplastic compositions can exhibit, for example, improved mechanical, thermal, and/or morphological properties. Further, for example, the thermoplastic compositions may show improved ductility and improved impact strength. Even further for example, the thermoplastic compositions may show improved ductility and improved impact strength without adversely affecting other mechanical and thermal properties.

Thermoplastic Polymer Component

The disclosed compositions can comprise one or more thermoplastic polymer resins. The thermoplastic polymer resins include, but are not limited to, polycarbonate, polyamide, polycarbonate-polysiloxane copolymer, polyphenylene sulfides, polyacetal, polyetheretherketone and polyimides. In a further aspect, the polyimides used in the disclosed composites include polyamideimides, polyetherimides and polybenzimidazoles. In a further aspect, polyetherimides comprise melt processable polyetherimides.

Suitable polyetherimides that can be used in the disclosed composites include, but are not limited to, ULTEM™. ULTEM™ is a polymer from the family of polyetherimides (PEI) sold by Saudi Basic Industries Corporation (SABIC). ULTEM™ can have elevated thermal resistance, high strength and stiffness, and broad chemical resistance. ULTEM™ as used herein refers to any or all ULTEM™ polymers included in the family unless otherwise specified. In a further aspect, the ULTEM™ is ULTEM™ 1000. In one aspect, a polyetherimide can comprise any polycarbonate material or mixture of materials, for example, as recited in U.S. Pat. No. 4,548,997; U.S. Pat. No. 4,629,759; U.S. Pat. No. 4,816,527; U.S. Pat. No. 6,310,145; and U.S. Pat. No. 7,230,066, all of which are hereby incorporated in its entirety for the specific purpose of disclosing various polyetherimide compositions and methods.

The thermoplastic polymer resin can be present in the disclosed composition in any desired amount as characterized by a weight percentage relative to the total weight of the composition. For example, according to aspects of the disclosure, the thermoplastic polymer resin can be present in an amount in the range of from about 5 weight % up to about 95 weight % relative to the total weight of the composition, including further exemplary amounts of about 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %. In still further aspects, the thermoplastic polymer resin can be present within any range of amount derived from any two of the above states values. For example, the thermoplastic polymer resin can be present in an amount in the range of from about 5 to about 15 weight %, or in an amount in the range of from about 5 weight % to about 20 weight %, or in an amount in the range of from about 50 weight % to about 85 weight % relative to the total weight of the composition.

In further aspects, the disclosed thermoplastic composition can comprise a thermoplastic polymer resin in an amount in the range of 1 wt % to 70 wt %, including exemplary values of 4 wt %, 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In still further aspects, the thermoplastic polymer resin amount can be in a range derived from any two of the above listed exemplary thermoplastic polymer resin amount values. For example, the thermoplastic polymer resin can be in an amount in the range of from 4 wt % to 40 wt %.

In still further aspects, the disclosed thermoplastic composition can comprise a total amount of thermoplastic polymer resin in an amount in the range of 1 wt % to 70 wt %, including exemplary values of 4 wt %, 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In still further aspects, the total thermoplastic polymer resin amount can be in a range derived from any two of the above listed exemplary total thermoplastic polymer resin amount values. For example, the total thermoplastic polymer resin can be in an amount in the range of from 40 wt % to 65 wt %.

In yet further aspects, the thermoplastic polymer resin can also be present in the composition in any desired amount as characterized by a volume percentage relative to the total volume of the composition. For example, according to aspects of the disclosure, the thermoplastic polymer resin can be present in an amount in the range of from about 5 volume % up to about 95 volume % relative to the total weight of the composite, including further exemplary amounts of about 10 volume %, 15 volume %, 20 volume %, 25 volume %, 30 volume %, 35 volume %, 40 volume %, 45 volume %, 50 volume %, 55 volume %, 60 volume %, 65 volume %, 70 volume %, 75 volume %, 80 volume %, 85 volume %, 90 volume %. In still further aspects, the thermoplastic polymer resin can be present within any range of amount derived from any two of the above states values. For example, the thermoplastic polymer resin can be present in an amount in the range of from about 5 to about 15 volume %, or in an amount in the range of from about 5 volume % to about 20 volume %, or in an amount in the range of from about 50 volume % to about 85 volume % relative to the total volume of the composition.

A. Polycarbonate Polymers

As described, according to aspects the thermoplastic resin component of a disclosed polymer composition can comprise a polycarbonate. The terms "polycarbonate" or "polycarbonates" as used herein includes copolycarbonates, homopolycarbonates and (co)polyester carbonates.

In one aspect, the polycarbonate can comprises aromatic carbonate chain units and includes compositions having structural units of the formula:

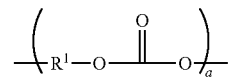

wherein at least about 60 percent of the total number of $R^1$ groups are aromatic organic radicals and the balance thereof are aliphatic, alicyclic, or aromatic radicals, wherein a is at least 2.

In one aspect, $R^1$ can be an aromatic organic radical and, such as a radical of the formula:

-$A^1$-$Y^1$-$A^2$- wherein each of $A^1$ and $A^2$ is a monocyclic, divalent aryl radical and $Y^1$ is a bridging radical having one or two atoms which separate $A^1$ from $A^2$. For example, one atom separates $A^1$ from $A^2$. Illustrative non-limiting examples of radicals of this type are —O—, —S—, —S(O)—, —S($O_2$)—, —C(O)—, methylene, cyclohexyl-methylene, 2-[2.2.1]-bicycloheptylidene, ethylidene, isopropylidene, neopentylidene, cyclohexylidene, cyclopentade-cylidene, cyclododecylidene, and adamantylidene. The bridging radical $Y^1$ can be a hydrocarbon group or a saturated hydrocarbon group such as methylene, cyclohexylidene or isopropylidene.

Polycarbonate resins can be produced by the reaction of the carbonate precursor with dihydroxy compounds. Typically, an aqueous base such as (e.g., sodium hydroxide, potassium hydroxide, calcium hydroxide, and the like) is mixed with an organic, water immiscible solvent such as benzene, toluene, carbon disulfide, or dichloromethane, which contains the dihydroxy compound. A phase transfer resin is generally used to facilitate the reaction. Molecular weight regulators may be added to the reactant mixture. These molecular weight regulators may be added singly or as a combination. Branching resins, described forthwith may also be added singly or in admixture. Another process for producing aromatic polycarbonate resins is the trans-esterification process, which involves the trans-esterification of an aromatic dihydroxy compound and a diester carbonate. This process is known as the melt polymerization process. The process of producing the aromatic polycarbonate resins is not critical.

As used herein, the term "dihydroxy compound" includes, for example, bisphenol compounds having general formula (1) as follows:

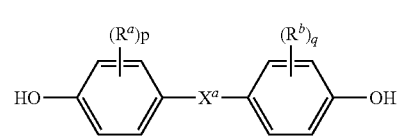

wherein $R^a$ and $R^b$ each represent a halogen atom, for example chlorine or bromine, or a monovalent hydrocarbon group, the monovalent hydrocarbon group can have from 1 to 10 carbon atoms, and can be the same or different; p and q are each independently integers from 0 to 4; Preferably, $X^a$ represents one of the groups of formula:

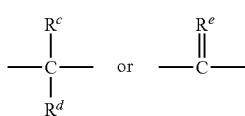

wherein $R^c$ and $R^d$ each independently represent a hydrogen atom or a monovalent linear or cyclic hydrocarbon group and R is a divalent hydrocarbon group.

Non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds includes Some illustrative, non-limiting examples of suitable dihydroxy compounds include the following: resorcinol, 4-bromoresorcinol, hydroquinone, 4,41-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl) propane, 1, 1-bis(hydroxyphenyl)cyclopentane, 1, 1-bis(4-hydroxyphenyl)cyclohexane, 1, 1-bis(4-hydroxyphenyl)isobutene, 1, 1-bis(4-hydroxyphenyl)cyclododecane, trans-2, 3-bis(4-hydroxyphenyl)-2-butene, 2,2-bis(4-hydroxyphenyl)adamantine, (alpha,alpha1-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl) propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1, 1-dibromo-2, 2-bis(4-hydroxyphenyl)ethylene, 1,1-dichloro-2,2-bis(5-phenoxy-4-hydroxyphenyl)ethylene, 4,4'dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydrox-yphenyl)ether, bis(4-hydroxyphenyl)sulfide, bis(4-hydroxyphenyl) sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2, 7-dihydroxyphenoxathin, 2, 7-dihydroxy-9, 10-dimethylphenazine, 3,6-dihydroxydibenzofuran, 3,6-dihydroxydibenzothiophene, and 2, 7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1, 1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alphadimethyl benzyl)phenol), 4-chloroformyl phthalic anhydride, trimesic acid, and benzophenone tetracarboxylic acid. The branching agents may be added at a level of about 0.05 wt % to about 2.0 wt %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Non-limiting examples of suitable phase transfer resins include, but are not limited to, tertiary amines such as triethylamine, quaternary ammonium compounds, and quaternary phosphonium compounds.

Among the phase transfer catalysts that may be used are catalysts of the formula $(R^2)_4Q+X$, wherein each $R^2$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)]_3NX$, and $CH_3[CH_3(CH_2)_2NX$, wherein X is Cl—, Br—, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another aspect an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate.

In one aspect, bisphenols can be used in the manufacture of polycarbonates containing phthalimidine carbonate units of formula (1a)

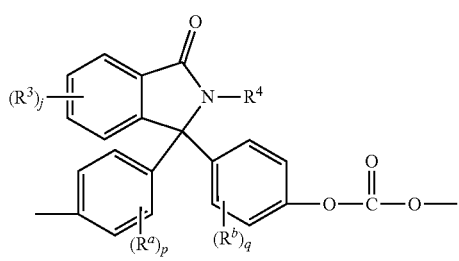

(1a)

wherein $R^a$, $R^b$, p, and q are as in formula (1), $R^3$ is each independently a $C_{1-6}$ alkyl group, j is 0 to 4, and $R^4$ is a $C_{1-6}$ alkyl, phenyl, or phenyl substituted with up to five $C_{1-6}$ alkyl groups. In particular, the phthalimidine carbonate units are of formula (1b)

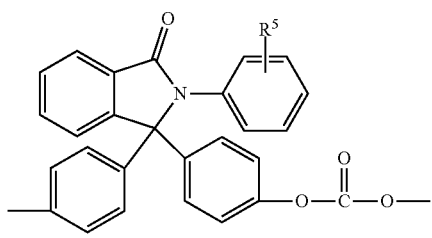

(1b)

wherein $R^5$ is hydrogen or a $C_{1-6}$ alkyl. In an aspect, $R^5$ is hydrogen. Carbonate units (1a) wherein $R^5$ is hydrogen can be derived from 2-phenyl-3,3'-bis(4-hydroxy phenyl) phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the instant carbonate units of formula (1c) and (1d)

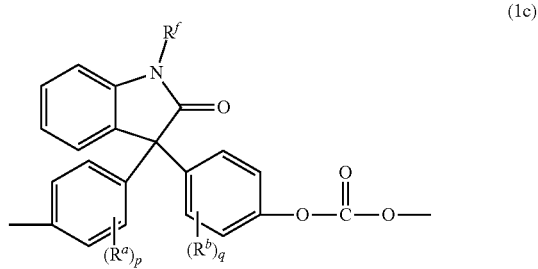

(1c)

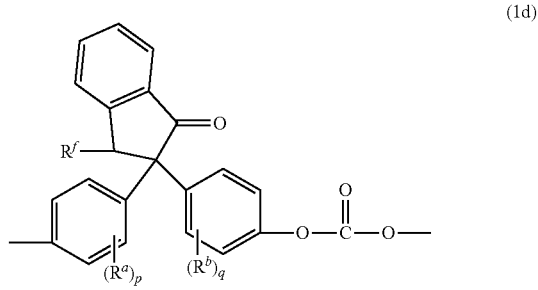

(1d)

wherein $R^a$ and $R^b$ are each independently $C_{1-12}$ alkyl, p and q are each independently 0 to 4, and $R^f$ is $C_{1-12}$ alkyl, phenyl, optionally substituted with 1 5 to $C_{1-10}$ alkyl, or benzyl optionally substituted with 1 to 5 $C_{1-10}$ alkyl. In an aspect, $R^a$ and $R^b$ are each methyl, p and q are each independently 0 or 1, and $R^f$ is $C_{1-4}$ alkyl or phenyl.

Examples of bisphenol carbonate units derived from bisphenols of formula (1) wherein $X^a$ is a substituted or unsubstituted $C_{3-18}$ cycloalkylidene include the cyclohexylidene-bridged, alkyl-substituted bisphenol of formula (12e)

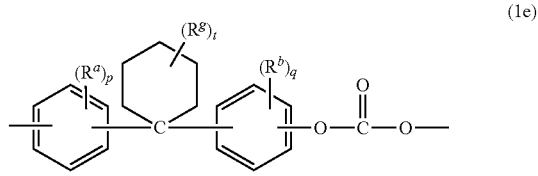

(1e)

wherein $R^a$ and $R^b$ are each independently $C_{1-12}$ alkyl, $R^g$ is $C_{1-12}$ alkyl, p and q are each independently 0 to 4, and t is 0 to 10. In a specific aspect, at least one of each of $R^a$ and $R^b$ are disposed meta to the cyclohexylidene bridging group. In an aspect, $R^a$ and $R^b$ are each independently $C_{1-4}$ alkyl, $R^g$ is $C_{1-4}$ alkyl, p and q are each 0 or 1, and t is 0 to 5. In another specific aspect, $R^a$, $R^b$, and $R^g$ are each methyl, r and s are each 0 or 1, and t is 0 or 3, specifically 0.

Examples of other bisphenol carbonate units derived from bisphenol wherein $X^a$ is a substituted or unsubstituted $C_{3-18}$ cycloalkylidene include adamantyl units (1f) and units (1g)

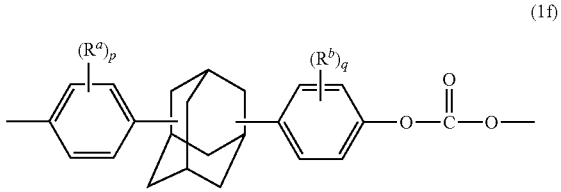

(1f)

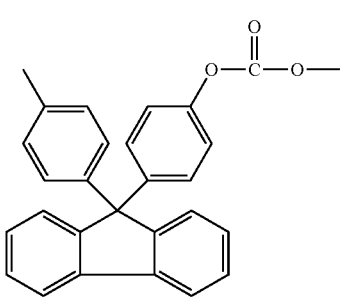

(1g)

wherein $R^a$ and $R^b$ are each independently $C_{1-12}$ alkyl, and p and q are each independently 1 to 4. In a specific aspect, at least one of each of $R^a$ and $R^b$ are disposed meta to the cycloalkylidene bridging group. In an aspect, $R^a$ and $R^b$ are each independently $C_{1-3}$ alkyl, and p and q are each 0 or 1. In another specific aspect, $R^a$, $R^b$ are each methyl, p and q are each 0 or 1. Carbonates containing units (1a) to (1g) are useful for making polycarbonates with high glass transition temperatures (Tg) and high heat distortion temperatures.

"Polycarbonates" and "polycarbonate polymers" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units, repeating units of formula (2)

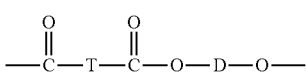

(2)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one aspect, D is a $C_{2-6}$ alkylene radical. In another aspect, D is derived from an aromatic dihydroxy compound of formula (3):

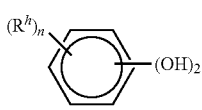

(3)

wherein each R is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (3) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propylhydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific aspect, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other aspects, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly (cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexanedimethanol-1,4-cyclohexanedicarboxylate) (PCCD), having recurring units of formula (15):

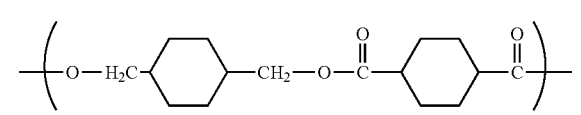

(4)

wherein, as described using formula (4), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Typical branching resins such as α,α,α',α'-tetrakis(3-methyl-4-hydroxyphenyl)-p-xylene, α,α,α',α'-tetrakis(2-methyl-4-hydroxyphenyl)-p-xylene, α,α,α',α'-tetrakis(2,5 dimethyl-4-hydroxyphenyl)-p-xylene, α,α,α',α'-tetrakis(2,6 dimethyl-4-hydroxyphenyl)-p-xylene, α,α,α',α'-tetrakis(4-hydroxyphenyl)-p-xylene, trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4-(4-(1,1-bis(p-hydroxyphenyl)-ethyl)alpha, alpha-dimethylbenzyl) phenol), 4-chloroformyl phthalic anhydride, trimesic acid, benzophe-none tetracarboxylic acid and the like, can also be added to the reaction mixture. Blends of linear polycarbonate and branched polycarbonate resins can be utilized herein. The branching agent may be added at a level of about 0.05 to about 2.0 weight percent (wt %).

Molecular weight regulators or chain stoppers are optional and are added to the mixture in order to arrest the progress of the polymerization. Typical molecular weight regulators such as phenol, chroman-1, p-t-butylphenol, p-bromophenol, para-cumyl-phenol, and the like may be added either singly or in admixture and are typically added in an amount of about 1 to about 10 mol % excess with respect to the BPA. The molecular weight of the polycarbonate is generally greater than or equal to about 5000, preferably greater than or equal to about 10,000, more preferably greater than or equal to about 15,000 g/mole. In one aspect, the molecular weight ranges from 18,000 to 40,000. In general it is desirable to have the polycarbonate resin less than or equal to about 100,000, preferably less than or equal to about 50,000, more preferably less than or equal to about 30,000 g/mole as calculated from the viscosity of a methylene chloride solution at 25° C. In one aspect, the polycarbonate can have a Mn of about 15,000 to about 30,000. In another aspect, the polycarbonate can have a Mn of about 20,000 to about 25,000. In another aspect, the polycarbonate can have a Mn of about 21,000. In another aspect, the polycarbonate can have a Mn of about 24,000.

In one aspect, the polymer composition comprises a first polycarbonate polymer and a second polycarbonate polymer.

In one aspect, the polycarbonate can comprise two or more polycarbonates. For example, the polycarbonate can comprise two polycarbonates. The two polycarbonates can be present in about equal or different amounts.

In one aspect, the polycarbonates can be a part of a co-polymer, wherein at least one part of the co-polymer is not a polycarbonate.

In another aspect, the polycarbonate comprises Lexan® Bisphenol A polycarbonate available from SABIC Innovative Plastics, USA.

In a further aspect, the first polycarbonate polymer has a weight average molecular weight of from about 15,000 g/mol to about 100,000 g/mol on an absolute polycarbonate molecular weight scale. In a still further aspect, the first polycarbonate polymer has a weight average molecular weight of from about 15,000 g/mol to about 50,000 g/mol on an absolute polycarbonate molecular weight scale. In a yet further aspect, the first polycarbonate polymer has a weight average molecular weight of from about 15,000 g/mol to about 45,000 g/mol on an absolute polycarbonate molecular weight scale. In an even further aspect, the first polycarbonate polymer has a weight average molecular weight of from about 15,000 g/mol to about 40,000 g/mol on an absolute polycarbonate molecular weight scale. In a still further aspect, the first polycarbonate polymer has a weight average molecular weight of from about 15,000 g/mol to about 35,000 g/mol on an absolute polycarbonate molecular weight scale. In a yet further aspect, the first polycarbonate polymer has a weight average molecular weight of from about 15,000 g/mol to about 30,500 g/mol on an absolute polycarbonate molecular weight scale. In an even further aspect, the first polycarbonate polymer has a weight average molecular weight of from about 15,000 g/mol to about 30,000 g/mol on an absolute polycarbonate molecular weight scale. In a still further aspect, the first polycarbonate polymer has a weight average molecular weight of from about 15,000 g/mol to about 29,000 g/mol on an absolute polycarbonate molecular weight scale.

In a further aspect, the first polycarbonate polymer has a weight average molecular weight of from about 20,000 g/mol to about 100,000 g/mol on an absolute polycarbonate molecular weight scale. In a still further aspect, the first polycarbonate polymer has a weight average molecular weight of from about 20,000 g/mol to about 50,000 g/mol on an absolute polycarbonate molecular weight scale. In a yet further aspect, the first polycarbonate polymer has a weight average molecular weight of from about 20,000 g/mol to about 45,000 g/mol on an absolute polycarbonate molecular weight scale. In an even further aspect, the first polycarbonate polymer has a weight average molecular weight of from about 20,000 g/mol to about 40,000 g/mol on an absolute polycarbonate molecular weight scale. In a still further aspect, the first polycarbonate polymer has a weight average molecular weight of from about 20,000 g/mol to about 35,000 g/mol on an absolute polycarbonate molecular weight scale. In a yet further aspect, the first polycarbonate polymer has a weight average molecular weight of from about 20,000 g/mol to about 30,500 g/mol on an absolute polycarbonate molecular weight scale. In an even further aspect, the first polycarbonate polymer has a weight average molecular weight of from about 20,000 g/mol to about 30,000 g/mol on an absolute polycarbonate molecular weight scale. In a still further aspect, the first polycarbonate polymer has a weight average molecular weight of from about 20,000 g/mol to about 29,000 g/mol on an absolute polycarbonate molecular weight scale.

In a further aspect, the first polycarbonate polymer has a weight average molecular weight of from about 25,000 g/mol to about 100,000 g/mol on an absolute polycarbonate molecular weight scale. In a still further aspect, the first polycarbonate polymer has a weight average molecular weight of from about 25,000 g/mol to about 50,000 g/mol on an absolute polycarbonate molecular weight scale. In a yet further aspect, the first polycarbonate polymer has a weight average molecular weight of from about 25,000 g/mol to about 45,000 g/mol on an absolute polycarbonate molecular weight scale. In an even further aspect, the first polycarbonate polymer has a weight average molecular weight of from about 25,000 g/mol to about 40,000 g/mol on an absolute polycarbonate molecular weight scale. In a still further aspect, the first polycarbonate polymer has a weight average molecular weight of from about 25,000 g/mol to about 35,000 g/mol on an absolute polycarbonate molecular weight scale. In a yet further aspect, the first polycarbonate polymer has a weight average molecular weight of from about 25,000 g/mol to about 30,500 g/mol on an absolute polycarbonate molecular weight scale. In an even further aspect, the first polycarbonate polymer has a weight average molecular weight of from about 25,000 g/mol to about 30,500 g/mol on an absolute polycarbonate molecular weight scale. In a still further aspect, the first polycarbonate polymer has a weight average molecular weight of from about 25,000 g/mol to about 30,000 g/mol on an absolute polycarbonate molecular weight scale. In a yet further aspect, the first polycarbonate polymer has a weight average molecular weight of from about 25,000 g/mol to about 29,000 g/mol on an absolute polycarbonate molecular weight scale.

In a further aspect, the first polycarbonate polymer is present in an amount from about 20 wt % to about 50 wt %. In a still further aspect, the first polycarbonate polymer is present in an amount from about 20 wt % to about 45 wt %. In a yet further aspect, the first polycarbonate polymer is present in an amount from about 20 wt % to about 40 wt %. In an even further aspect, the first polycarbonate polymer is present in an amount from about 20 wt % to about 35 wt %. In a still further aspect, the first polycarbonate polymer is present in an amount from about 20 wt % to about 30 wt %.

In a further aspect, the first polycarbonate polymer is present in an amount from about 22 wt % to about 50 wt %. In a still further aspect, the first polycarbonate polymer is present in an amount from about 22 wt % to about 45 wt %. In a yet further aspect, the first polycarbonate polymer is present in an amount from about 22 wt % to about 40 wt %. In an even further aspect, the first polycarbonate polymer is present in an amount from about 22 wt % to about 35 wt %. In a still further aspect, the first polycarbonate polymer is present in an amount from about 22 wt % to about 30 wt %.

In a further aspect, the first polycarbonate polymer is present in an amount from about 25 wt % to about 50 wt %. In a still further aspect, the first polycarbonate polymer is present in an amount from about 25 wt % to about 45 wt %. In a yet further aspect, the first polycarbonate polymer is present in an amount from about 25 wt % to about 40 wt %. In an even further aspect, the first polycarbonate polymer is present in an amount from about 25 wt % to about 35 wt %. In a still further aspect, the first polycarbonate polymer is present in an amount from about 25 wt % to about 30 wt %.

In a further aspect, the second polycarbonate polymer has a weight average molecular weight of from about 15,000 g/mol to about 100,000 g/mol on an absolute polycarbonate molecular weight scale. In a still further aspect, the second polycarbonate polymer has a weight average molecular weight of from about 15,000 g/mol to about 50,000 g/mol on an absolute polycarbonate molecular weight scale. In a yet further aspect, the second polycarbonate polymer has a weight average molecular weight of from about 15,000 g/mol to about 45,000 g/mol on an absolute polycarbonate molecular weight scale. In an even further aspect, the second polycarbonate polymer has a weight average molecular weight of from about 15,000 g/mol to about 40,000 g/mol on an absolute polycarbonate molecular weight scale. In a still further aspect, the second polycarbonate polymer has a weight average molecular weight of from about 15,000 g/mol to about 35,000 g/mol on an absolute polycarbonate molecular weight scale. In a yet further aspect, the second polycarbonate polymer has a weight average molecular weight of from about 15,000 g/mol to about 30,000 g/mol on an absolute polycarbonate molecular weight scale. In an even further aspect, the second polycarbonate polymer has a weight average molecular weight of from about 15,000 g/mol to about 25,000 g/mol on an absolute polycarbonate molecular weight scale.

In a further aspect, the second polycarbonate polymer has a weight average molecular weight of from about 20,000 g/mol to about 100,000 g/mol on an absolute polycarbonate molecular weight scale. In a still further aspect, the second polycarbonate polymer has a weight average molecular weight of from about 20,000 g/mol to about 50,000 g/mol on an absolute polycarbonate molecular weight scale. In a yet further aspect, the second polycarbonate polymer has a weight average molecular weight of from about 20,000 g/mol to about 45,000 g/mol on an absolute polycarbonate molecular weight scale. In an even further aspect, the second polycarbonate polymer has a weight average molecular weight of from about 20,000 g/mol to about 40,000 g/mol on an absolute polycarbonate molecular weight scale. In a still further aspect, the second polycarbonate polymer has a weight average molecular weight of from about 20,000 g/mol to about 35,000 g/mol on an absolute polycarbonate molecular weight scale. In a yet further aspect, the second polycarbonate polymer has a weight average molecular weight of from about 20,000 g/mol to about 30,000 g/mol on an absolute polycarbonate molecular weight scale. In an even further aspect, the second polycarbonate polymer has a weight average molecular weight of from about 20,000 g/mol to about 25,000 g/mol on an absolute polycarbonate molecular weight scale.

In a further aspect, the second polycarbonate polymer is present in an amount from about 20 wt % to about 50 wt %. In a still further aspect, the second polycarbonate polymer is present in an amount from about 20 wt % to about 45 wt %. In a yet further aspect, the second polycarbonate polymer is present in an amount from about 20 wt % to about 40 wt %. In an even further aspect, the second polycarbonate polymer is present in an amount from about 20 wt % to about 35 wt %. In a still further aspect, the second polycarbonate polymer is present in an amount from about 20 wt % to about 30 wt %.

In a further aspect, the second polycarbonate polymer is present in an amount from about 22 wt % to about 50 wt %. In a still further aspect, the second polycarbonate polymer is present in an amount from about 22 wt % to about 45 wt %. In a yet further aspect, the second polycarbonate polymer is present in an amount from about 22 wt % to about 40 wt %. In an even further aspect, the second polycarbonate polymer is present in an amount from about 22 wt % to about 35 wt %. In a still further aspect, the second polycarbonate polymer is present in an amount from about 22 wt % to about 30 wt %.

In a further aspect, the second polycarbonate polymer is present in an amount from about 25 wt % to about 50 wt %. In a still further aspect, the second polycarbonate polymer is present in an amount from about 25 wt % to about 45 wt %. In a yet further aspect, the second polycarbonate polymer is present in an amount from about 25 wt % to about 40 wt %. In an even further aspect, the second polycarbonate polymer is present in an amount from about 25 wt % to about 35 wt %. In a still further aspect, the second polycarbonate polymer is present in an amount from about 25 wt % to about 30 wt %.

B. Polyamide Polymers

In one aspect, the thermoplastic polymer component of a disclosed composition can comprise a polyamide polymer. Polyamides, also known as nylons, may be obtained by a number of well-known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamide resins are also commercially available from a variety of sources.

Polyamides are generally derived from the polymerization of organic lactams having from 4 to 12 carbon atoms.

In various aspects, the polyamides of the present invention are polymerized from lactams of the formula:

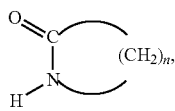

wherein n is about 3 to about 11. In a further aspect, the lactam is epsilon-caprolactam having n equal to 5.

In various further aspects, the polyamide can be synthesized using an α,β-unsaturated gamma-lactone (such as 2(5H-furanone) to effect the regular, sequential alignment of side chains along a polyamide backbone of the formula:

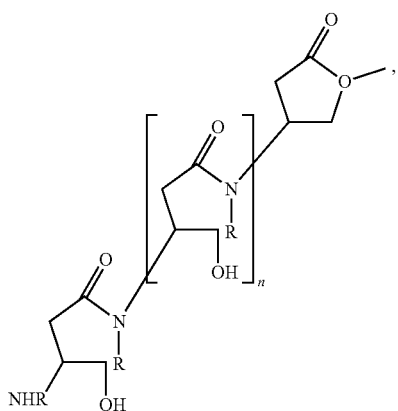

wherein n is about 50 to about 10,000, wherein each R is 1 to about 50 carbon atoms and is optionally substituted with heteroatoms, oxygen, nitrogen, sulfur, or phosphorus and combinations thereof. Depending on the side group (R), the method can produce many different types of polyamides. For instance, when R is a saturated long-chain alkyl group (such as when the amine is tetradecylamine), a polymer having alkyl chains on one side of the polymer backbone and hydroxymethyl groups on the other side of the backbone is formed. When the R group is a polyamine (such as pentaethylenehexamine), a polymer having amino substituted alkyl chains on one side of the polymer backbone and hydroxymethyl groups on the other side of the backbone is formed.

Polyamides of the present invention can also be synthesized from amino acids having about 4 to about 12 carbon atoms. In various aspects, the polyamides of the present invention are polymerized from amino acids of the formula

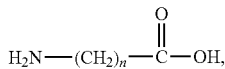

wherein n is about 3 to about 11. In a further aspect, the amino acid is epsilon-aminocaproic acid with n equal to about 5.

Polyamides can also be polymerized from aliphatic dicarboxylic acids having from about 4 to about 12 carbon atoms and aliphatic diamines having from about 2 to about 12 carbon atoms. In various aspects, the polyamides of the present invention are polymerized from aliphatic diamines of the formula:

wherein n is about 2 to about 12. In a further aspect, the aliphatic diamine is hexamethylenediamine ($H_2N(CH_2)_6NH_2$). In a still further aspect, the molar ratio of the dicarboxylic acid to the diamine is about 0.66 to about 1.5. In a yet further aspect, the molar ratio is about 0.81 to about 1.22. In an even further aspect, the molar ratio is about 0.96 to about 1.04.

The dicarboxylic acids can be aliphatic dicarboxylic acids, cycloaliphatic dicarboxylic acids, or aromatic dicarboxylic acids. Examples of aliphatic dicarboxylic acids are aliphatic diacids that include carboxylic acids having two carboxyl groups. Suitable examples of cycloaliphatic acids include decahydro naphthalene dicarboxylic acid, norbornene dicarboxylic acids, bicyclo octane dicarboxylic acid, cis-1,4-cyclohexanedicarboxylic acid and trans-1,4-cyclohexanedicarboxylic acids or the like, or a combination comprising at least one of the foregoing acids. In various further aspect, cycloaliphatic diacids are cis-1,4-cyclohexanedicarboxylic acid and trans-1,4-cyclohexanedicarboxylic acids. Examples of linear aliphatic diacids are oxalic acid, malonic acid, pimelic acid, gluteric acid, suberic acid, succinic acid, adipic acid, dimethyl succinic acid, azelaic acid, or the like, or a combination comprising at least one of the foregoing acids. Examples of aromatic dicarboxylic acids are terephthalic acid, phthalic acid, isophthalic acid, naphthalene dicarboxylic acid, or the like, or a combination comprising at least one of the foregoing dicarboxylic acids.

In various aspects, the polyamides of the present invention comprise polypyrrolidone (nylon-4), polycaprolactam (nylon-6), polycapryllactam (nylon-8), polyhexamethylene adipamide (nylon-6,6), polyundecanolactam (nylon-11), polydodecanolactam (nylon-12), polyhexamethylene azelaiamide (nylon-6,9), polyhexamethylene, sebacamide (nylon-6,10), polyhexamethylene isophthalamide (nylon-6,I), polyhexamethylene terephthalamide (nylon-6,T), polyamides of hexamethylene diamine and n-dodecanedioic acid (nylon-6,12), as well as polyamides resulting from terephthalic acid and/or isophthalic acid and trimethyl hexamethylene diamine, polyamides resulting from adipic acid and meta xylenediamines, polyamides resulting from adipic acid, azelaic acid and 2,2-bis-(p-aminocyclohexyl)propane, polyamides resulting from terephthalic acid and 4,4'-diaminodicyclohexylmethane, and combinations comprising one or more of the foregoing polyamides. The composition may comprise two or more polyamides. For example, the polyamide may comprise nylon-6 and nylon-6,6.

Copolymers of the foregoing polyamides are also suitable for use in the practice of the present disclosure. Exemplary polyamide copolymers comprise copolymers of hexamethylene adipamide/caprolactam (nylon-6,6/6), copolymers of caproamide/undecamide (nylon-6/11), copolymers of caproamide/dodecamide (nylon-6/12), copolymers of hexamethylene adipamide/hexamethylene isophthalamide (nylon-6,6/6,I), copolymers of hexamethylene adipamide/hexamethylene terephthalamide (nylon-6,6/6,T), copolymers of hexamethylene adipamide/hexamethylene azelaiamide (nylon-6,6/6,9), and combinations thereof.

Polyamides, as used herein, also comprise the toughened or super tough polyamides. Generally, these super tough nylons are prepared by blending one or more polyamide with one or more polymeric or copolymeric elastomeric toughening agent. Suitable toughening agents can be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer. Super tough polyamides, or super tough nylons, as they are more commonly known, include those available commercially, e.g. from E.I. duPont under the trade name ZYTEL ST, or those prepared in accordance with U.S. Pat. No. 4,174,358 to Epstein; U.S. Pat. No. 4,474,927 to Novak; U.S. Pat. No. 4,346,194 to Roura; and U.S. Pat. No. 4,251,644 to Jeffrion, among others and combinations comprising at least one of the foregoing, can be employed.

In some aspects, the polyamide has a viscosity of about 30 to about 60, including exemplary amounts of 31, 32, 33, 34, 35, 36, 37, 38, 39, 40, 41, 42, 43, 44, 45, 46, 47, 48, 49, 50, 51, 52, 53, 54, 55, 56, 57, 58, and 59. In still further aspects, the viscosity can be in a range derived from any two of the above listed exemplary viscosity values. For example, the viscosity can in the range of from 35 to 59. Relative viscosity is determined according to DIN 53727 in a 1 weight percent solution in 90 weight percent formic acid.

In some aspects, the polyamide resin comprises a polyamide having an amine end group concentration greater than or equal to 35 microequivalents amine end group per gram of polyamide (f·teq/g) as determined by titration with hydrochloric acid. The amine end group concentration may be greater than or equal to 40 f·teq/g, more specifically about 40 to about 70 f·teq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The polyamide component can be present in the thermoplastic composition in any desired amount. For example, in aspects of the disclosure, the polyamide polymer is present in an amount of at least 10 weight percent relative to the total weight of the thermoplastic composition. For example, the polyamide polymer can be present in an amount in the range of from 10 weight % to 80 weight % relative to the total weight of the thermoplastic composition, including exemplary amounts of 15 weight %, 20 weight %, 25 weight %, 30 weight %, 35 weight %, 40 weight %, 45 weight %, 50 weight %, 55 weight %, 60 weight %, 65 weight %, 70 weight %, and 75 weight %. In still further aspects, the polyamide polymer can be present within any range of amounts derived from any two of the above stated values. For example, the polyamide polymer can be present in an amount in the range of from about 10 to about 20 weight %, or in an amount in the range of from about 40 weight % to about 60 weight %.

C. Polycarbonate-Polysiloxane Copolymers

In some aspects, the disclosed thermoplastic compositions can further comprise a polycarbonate-polysiloxane block copolymer. As used herein, the term polycarbonate-polysiloxane copolymer is equivalent to polysiloxane-polycarbonate copolymer, polycarbonate-polysiloxane polymer, or polysiloxane-polycarbonate polymer. The polysiloxane-polycarbonate copolymer comprises polydiorganosiloxane blocks comprising structural units of the general formula (5) below:

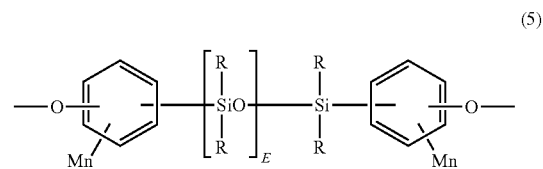

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks having structural units of the formula:

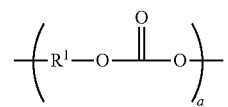

wherein at least about 60 percent of the total number of $R^1$ groups are aromatic organic radicals and the balance thereof are aliphatic, alicyclic, or aromatic radicals, wherein a is at least 2.

According to exemplary non-limiting aspects of the disclosure, the polycarbonate-polysiloxane block copolymer comprises diorganopolysiloxane blocks of the general formula (6) below:

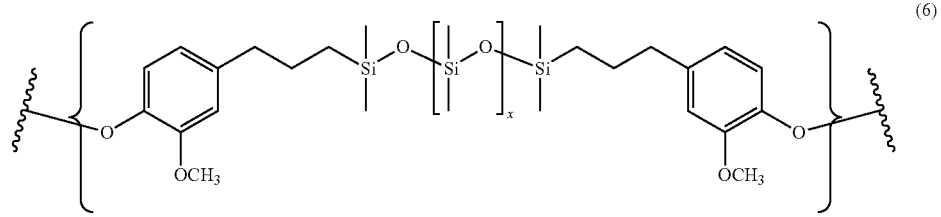

wherein x represents an integer from about 20 to about 60. The polycarbonate blocks according to these aspects can be derived from bisphenol-A monomers.

Diorganopolysiloxane blocks of formula (6) above can be derived from the corresponding dihydroxy compound of formula (7):

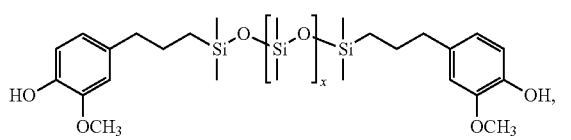

(7)

wherein x is as described above. Compounds of this type and others are further described in U.S. Pat. No. 4,746,701 to Kress, et al and U.S. Pat. No. 8,017,697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (8):

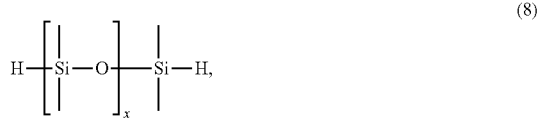

(8)

wherein x is a previously defined, and an aliphatically unsaturated monohydric phenol such as eugenol to yield a compound of formula (7).

The polycarbonate-polysiloxane copolymer may be manufactured by reaction of a diphenolic polysiloxane, such as that depicted by formula (7), with a carbonate source and a dihydroxy aromatic compound such as bisphenol-A, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-polysiloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane can be selected so as to provide the desired amount of diorganopolysiloxane units in the copolymer. The particular amounts used will therefore be determined depending on desired physical properties of the composition, the value of x (for example, within the range of about 20 to about 60), and the type and relative amount of each component in the composition, including the type and amount of polycarbonate, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein.

For example, according to aspects of the disclosure, the polysiloxane-polycarbonate block copolymer can be provided having any desired level of siloxane content. For example, the siloxane content can be in the range of from 4 mole % to 20 mole %. In additional aspects, the siloxane content of the polysiloxane-polycarbonate block copolymer can be in the range of from 4 mole % to 10 mole %. In still further aspects, the siloxane content of the polysiloxane-polycarbonate block copolymer can be in the range of from 4 mole % to 8 mole %. In a further aspect, the polysiloxane-polycarbonate copolymer comprises a diorganosiloxane content in the range of from 5 to 7 mole wt %. In an even further exemplary aspect, the siloxane content of the polysiloxane-polycarbonate block copolymer can be about 6 mole %. Still further, the diorganopolysiloxane blocks can be randomly distributed in the polysiloxane-polycarbonate block copolymer.

The disclosed polysiloxane-polycarbonate block copolymers can also be endcapped as similarly described in connection with the manufacture of polycarbonates set forth herein. For example, according to aspects of the disclosure, a polysiloxane-polycarbonate block copolymer can be end capped with p-cumyl-phenol.

A non-limiting example of a commercially available polycarbonate-siloxane copolymer includes transparent EXL, commercially available from SABIC Innovative Plastics. The transparent EXL from SABIC is a polycarbonate-polysiloxane (9030T) copolymer, having been tested commercially and found to have about 6 mole % siloxane, a Mw of about 44,600, and a Mn of about 17800 in a polystyrene standard using chloroform solvent.

The polysiloxane polycarbonate copolymer component can be present in the thermoplastic composition in any desired amount. For example, in aspects of the disclosure, the polysiloxane polycarbonate copolymer is present in an amount of at least 10 weight percent relative to the total weight of the thermoplastic composition. For example, the polycarbonate-polysiloxane copolymer can be present in an amount in the range of from 10 weight % to 80 weight % relative to the total weight of the thermoplastic composition, including exemplary amounts of 15 weight %, 20 weight %, 25 weight %, 30 weight %, 35 weight %, 40 weight %, 45 weight %, 50 weight %, 55 weight %, 60 weight %, 65 weight %, 70 weight %, and 75 weight %. In still further aspects, the polysiloxane polycarbonate copolymer can be present within any range of amounts derived from any two of the above stated values. For example, the polysiloxane polycarbonate copolymer can be present in an amount in the range of from about 10 to about 20 weight %, or in an amount in the range of from about 60 weight % to about 80 weight %.

In one aspect, the polycarbonate siloxane copolymer used comprises about 20% by weight of siloxane, 80% by weight BPA and endcapped with paracumyl phenol.

Laser Direct Structuring Additive

The disclosed thermoplastic composition further comprises a laser direct structuring (LDS) additive comprising a mean particle size equal to or less than 1 µm. The LDS additive comprising a mean particle size equal to or less than 1 µm could be considered nano-size. As used herein, a laser direct structuring additive refers to metal containing additive suitable for use in a laser direct structuring process. To that end, as discussed more fully herein, an LDS additive is selected such that, after activating with a laser, a conductive path can be formed on the injection molded composite surface by a subsequent standard metallization or plating process. As such, when the LDS additive is exposed to a laser, elemental metal is released or activated. The laser, thus, draws the circuit pattern onto the thermoplastic part and leaves behind a roughened surface containing embedded metal particles. These particles act as nuclei for the crystal growth during a subsequent metallization or plating process, such as a copper plating process or other plating processes, including gold plating, nickel plating, silver plating, zinc plating, tin plating or the like.

The LDS additive comprising a mean particle size equal to or less than 1 µm demonstrates enhanced plating performance, as well as retaining suitable mechanical properties, compared to an LDS additive comprising a mean particle size greater than 1 µm, e.g. an LDS additive comprising a mean particle of micro-size or of conventional size. The LDS additive comprising a mean particle size equal to or less than 1 µm also demonstrates better dispersion in the thermoplastic composition. Without wishing to be bound to this theory, the LDS additive with a mean particle size equal to or less than 1 µm allows the use of more additive without changing the mechanical properties, by the smaller size being able to pack more efficiently. In other words, the LDS additive with a mean particle size equal to or less than 1 µm has an optimized matrix.

According to aspects of the disclosure, the laser direct structuring additive can comprise one or more metal oxides, including for example, oxides of chromium, copper, or combinations thereof. These laser direct structuring additives can also be provided having spinel type crystal structures. An exemplary and non-limiting example of a commercially available laser direct structuring additive includes the Black 1G pigment black, commercially available from The Shepherd Color company. The Black 1G pigment black, for example, comprises chromium oxides ($Cr_2O_3$, $Cr_2O_4^{2-}$, $Cr_2O_7^{2-}$) and oxides of copper (CuO), as determined using XPS. The Black 1G pigment black has a spinel type crystal structure. Another exemplary commercially available laser direct structuring additive is the Black 30C965 pigment black commercially available from The Shepherd Color company, and has a mean particle size of 0.6 µm.

In one aspect, the LDS additive comprises a heavy metal mixture oxide spinel or a copper salt, or a combination thereof.

In one aspect, the LDS additive has a mean particle size in an amount that ranges from 0.01 µm to 1 µm, including exemplary values of 0.05 µm, 0.08 µm, 0.1 µm, 0.2 µm, 0.3 µm, 0.4 µm, 0.5 µm, 0.6 µm, 0.7 µm, 0.8 µm, and 0.9 µm. In still further aspects, the mean particle size can be in a range derived from any two of the above listed exemplary mean particle size values. For example, the mean particle size can be in the range of 0.08 µm to 0.8 µm or in the range of 0.5 µm to 0.7 µm. In a yet further aspect, the mean particle size can be each exemplary value, for example, the mean particle size can be 0.6 µm.

In one aspect, the LDS additive has a mean particle size in an amount greater than 1 µm, including exemplary values of 1.1 µm, 1.2 µm, 1.3 µm, 1.4 µm, 1.5 µm, 1.6 µm, 1.7 µm, 1.8 µm, 1.9 µm, and 2.0 µm. In still further aspects, the mean particle size can be each exemplary value, for example, the mean particle size can be 1.5 µm.

In one aspect, the LDS additive has combination of particle sizes with some of the particles having a mean particle size equal to or less than 1 µm. In another aspect, the LDS additive comprises nano size particles, 0.01 µm to 1 µm, and particles larger than 1 µm, for example, a LDS additive having a mean particle size of 0.6 µm and a LDS additive having mean particle size of 1.5 µm. In a further aspect, the particles larger than 1 µm can comprise particles with a mean particle of micro-size or of conventional size.

The laser direct structuring additive can be present in the thermoplastic composition in an amount in the range of from greater than zero to 15 weight % relative to the total weight of the thermoplastic composition, including for example, amounts of about 1 weight %, about 2 weight %, about 3 weight %, about 4 weight %, about 5 weight %, about 6 weight %, about 7 weight %, about 8 weight %, about 9 weight %, about 10 weight %, about 11 weight %, about 12 weight %, about 13 weight %, and about 14 weight %. In still further aspects, the laser direct structure (LDS) additive can be present in the thermoplastic composition in an amount within any range of amounts derived from any two of the above stated values. For example, the laser direct structuring additive can be present in an amount of from 1 weight % to 7 weight % relative to the total weight of the thermoplastic composition. In an even further aspect, the laser direct structuring additive can be present in the thermoplastic composition in an amount of about 3 weight % relative to the total weight of the thermoplastic composition. In a yet further aspect, the laser direct structuring additive can be present in the thermoplastic composition in an amount of about 4 weight % relative to the total weight of the thermoplastic composition.

Impact Modifiers

In one aspect, the disclosed compositions of the present invention comprise an impact modifying agent, or impact modifier. In a further aspect, the disclosed compositions can comprise one or more impact modifiers. In a still further aspect, the disclosed compositions can comprise at least one impact modifier. In a yet further aspect, the disclosed compositions comprise two impact modifiers, that is, a first impact modifier component and a second impact modifier component.

In a further aspect, the impact modifier of the present invention is selected from an acrylonitrile-butadiene-styrene polymer (ABS), an acrylonitrile-styrene-butyl acrylate (ASA) polymer, a methyl methacrylate-acrylonitrile-butadiene-styrene (MABS) polymer, a methyl methacrylate-butadiene-styrene (MBS) polymer, and an acrylonitrile-ethylene-propylene-diene-styrene (AES) polymer. In a still further aspect, the impact modifier is an acrylonitrile-butadiene-styrene polymer ("ABS polymer"). In a still further aspect, a suitable impact modifier is a bulk polymerized ABS polymer ("BABS polymer" or "Bulk ABS polymer").

Acrylonitrile-butadiene-styrene ("ABS") graft copolymers contain two or more polymeric parts of different compositions, which are bonded chemically. The graft copolymer is specifically prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and specifically two, are polymerized in the presence of the polymer backbone to obtain the graft copolymer. These resins are prepared by methods well known in the art.

For example, ABS can be made by one or more of emulsion or solution polymerization processes, bulk/mass, suspension and/or emulsion-suspension process routes. In addition, ABS materials can be produced by other process techniques such as batch, semi batch and continuous polymerization for reasons of either manufacturing economics or product performance or both. In order to reduce point defects or inclusions in the inner layer of the final multilayer article, the ABS is produced by bulk polymerized.

Emulsion polymerization of vinyl monomers gives rise to a family of addition polymers. In many instances the vinyl emulsion polymers are copolymers containing both rubbery and rigid polymer units. Mixtures of emulsion resins, especially mixtures of rubber and rigid vinyl emulsion derived polymers are useful in blends.

Such rubber modified thermoplastic resins made by an emulsion polymerization process can comprise a discontinuous rubber phase dispersed in a continuous rigid thermoplastic phase, wherein at least a portion of the rigid thermoplastic phase is chemically grafted to the rubber phase. Such a rubbery emulsion polymerized resin can be further blended with a vinyl polymer made by an emulsion or bulk polymerized process. However, at least a portion of the vinyl polymer, rubber or rigid thermoplastic phase, blended with polycarbonate, will be made by emulsion polymerization.

Suitable rubbers for use in making a vinyl emulsion polymer blend are rubbery polymers having a glass transition temperature (Tg) of less than or equal to 25° C., more preferably less than or equal to 0° C., and even more preferably less than or equal to −30° C. As referred to herein, the Tg of a polymer is the Tg value of polymer as measured by differential scanning calorimetry (heating rate 20° C./minute, with the Tg value being determined at the inflection point). In another embodiment, the rubber comprises a linear polymer having structural units derived from one or more conjugated diene monomers. Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In a preferred embodiment, the conjugated diene monomer is 1,3-butadiene.

The emulsion polymer may, optionally, include structural units derived from one or more copolymerizable monoethylenically unsaturated monomers selected from ($C_2$-$C_{12}$) olefin monomers, vinyl aromatic monomers and monoethylenically unsaturated nitrile monomers and ($C_2$-$C_{12}$) alkyl (meth)acrylate monomers. As used herein, the term "($C_2$-$C_{12}$) olefin monomers" means a compound having from 2 to 12 carbon atoms per molecule and having a single site of ethylenic unsaturation per molecule. Suitable ($C_2$-$C_{12}$) olefin monomers include, e.g., ethylene, propene, 1-butene, 1-pentene, heptene, 2-ethyl-hexylene, 2-ethyl-heptene, 1-octene, and 1-nonene. As used herein, the term "($C_1$-$C_{12}$) alkyl" means a straight or branched alkyl substituent group having from 1 to 12 carbon atoms per group and includes, e.g., methyl, ethyl, n-butyl, sec-butyl, t-butyl, n-propyl, isopropyl, pentyl, hexyl, heptyl, octyl, nonyl, decyl, undecyl and dodecyl, and the terminology "(meth)acrylate monomers" refers collectively to acrylate monomers and methacrylate monomers.

The rubber phase and the rigid thermoplastic phase of the emulsion modified vinyl polymer may, optionally, include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy ($C_1$-$C_{12}$) alkyl (meth)acrylate monomers such as, e.g., hydroxyethyl methacrylate; ($C_5$-$C_{12}$) cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_5$-$C_{12}$) cycloalkyl" means a cyclic alkyl substituent group having from 5 to 12 carbon atoms per group and the term "(meth)acrylamide" refers collectively to acrylamides and methacrylamides.

In some cases the rubber phase of the emulsion polymer is derived from polymerization of a butadiene, $C_4$-$C_{12}$ acrylates or combination thereof with a rigid phase derived from polymerization of styrene, $C_1$-$C_3$ acrylates, methacrylates, acrylonitrile or combinations thereof where at least a portion of the rigid phase is grafted to the rubber phase. In other instances more than half of the rigid phase will be grafted to the rubber phase.

Suitable vinyl aromatic monomers include, e.g., styrene and substituted styrenes having one or more alkyl, alkoxyl, hydroxyl or halo substituent group attached to the aromatic ring, including, e.g., -methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers. As used herein, the term "monoethylenically unsaturated nitrile monomer" means an acyclic compound that includes a single nitrile group and a single site of ethylenic unsaturation per molecule and includes, e.g., acrylonitrile, methacrylonitrile, a-chloro acrylonitrile.

In an alternative embodiment, the rubber is a copolymer, preferably a block copolymer, comprising structural units derived from one or more conjugated diene monomers and up to 90 percent by weight ("wt %") structural units derived from one or more monomers selected from vinyl aromatic monomers and monoethylenically unsaturated nitrile monomers, such as, a styrene-butadiene copolymer, an acrylonitrile-butadiene copolymer or a styrene-butadiene-acrylonitrile copolymer. In another embodiment, the rubber is a styrene-butadiene block copolymer that contains from 50 to 95 wt % structural units derived from butadiene and from 5 to 50 wt % structural units derived from styrene.

The emulsion derived polymers can be further blended with non-emulsion polymerized vinyl polymers, such as those made with bulk or mass polymerization techniques. A process to prepare mixtures containing polycarbonate, an emulsion derived vinyl polymer, along with a bulk polymerized vinyl polymers, is also contemplated.

The rubber phase can be made by aqueous emulsion polymerization in the presence of a radical initiator, a surfactant and, optionally, a chain transfer agent and coagulated to form particles of rubber phase material. Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents include, for example, a ($C_9$-$C_{13}$) alkyl mercaptan compound such as nonyl mercaptan, t-dodecyl mercaptan. Suitable emulsion aids include, linear or branched carboxylic acid salts, with about 10 to 30 carbon atoms. Suitable salts include ammonium carboxylates and alkaline carboxylates; such as ammonium stearate, methyl ammonium behenate, triethyl ammonium stearate, sodium stearate, sodium isostearate, potassium stearate, sodium salts of tallow fatty acids, sodium oleate, sodium palmitate, potassium linoleate, sodium laurate, potassium abieate (rosin acid salt), sodium abietate and combinations thereof. Often mixtures of fatty acid salts derived from natural sources such as seed oils or animal fat (such as tallow fatty acids) are used as emulsifiers.

In one aspect, the emulsion polymerized particles of rubber phase material have a weight average particle size of 50 to 800 nanometers ("nm"), more preferably, of from 100 to 500 nm, as measured by light transmission. The size of emulsion polymerized rubber particles can optionally be increased by mechanical, colloidal or chemical agglomeration of the emulsion polymerized particles, according to known techniques.

The rigid thermoplastic phase comprises one or more vinyl derived thermoplastic polymers and exhibits a Tg of greater than 25° C., preferably greater than or equal to 90° C. and even more preferably greater than or equal to 100° C.

In various aspects, the rigid thermoplastic phase comprises a vinyl aromatic polymer having first structural units derived from one or more vinyl aromatic monomers, preferably styrene, and having second structural units derived from one or more monoethylenically unsaturated nitrile monomers, preferably acrylonitrile. In other cases, the rigid phase comprises from 55 to 99 wt %, still more preferably 60 to 90 wt %, structural units derived from styrene and from 1 to 45 wt %, still more preferably 10 to 40 wt %, structural units derived from acrylonitrile.

The amount of grafting that takes place between the rigid thermoplastic phase and the rubber phase can vary with the relative amount and composition of the rubber phase. In one embodiment, from 10 to 90 wt %, often from 25 to 60 wt %, of the rigid thermoplastic phase is chemically grafted to the rubber phase and from 10 to 90 wt %, preferably from 40 to 75 wt % of the rigid thermoplastic phase remains "free", i.e., non-grafted.

The rigid thermoplastic phase of the rubber modified thermoplastic resin can be formed solely by emulsion polymerization carried out in the presence of the rubber phase or by addition of one or more separately polymerized rigid thermoplastic polymers to a rigid thermoplastic polymer that has been polymerized in the presence of the rubber phase. In one embodiment, the weight average molecular weight of the one or more separately polymerized rigid thermoplastic polymers is from about 50,000 to about 100,000 g/mol.

In other cases, the rubber modified thermoplastic resin comprises a rubber phase having a polymer with structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers. In one embodiment, the rubber phase of the rubber modified thermoplastic resin comprises a polybutadiene or poly(styrene-butadiene) rubber and the rigid thermoplastic phase comprises a styrene-acrylonitrile copolymer. Vinyl polymers free of alkyl carbon-halogen linkages, specifically bromine and chlorine carbon bond linkages can provide melt stability.

In some instances it is desirable to isolate the emulsion vinyl polymer or copolymer by coagulation in acid. In such instances the emulsion polymer can be contaminated by residual acid, or species derived from the action of such acid, for example carboxylic acids derived from fatty acid soaps used to form the emulsion. The acid used for coagulation can be a mineral acid; such as sulfuric acid, hydrochloric acid, nitric acid, phosphoric acid or mixtures thereof. In some cases the acid used for coagulation has a pH less than about 5.

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), methacrylate-butadiene (MB) and styrene-acrylonitrile (SAN).

In a further aspect, the impact modifier component comprises one more of an acrylonitrile butadiene styrene ("ABS") copolymer, a methacrylate butadiene styrene ("MBS") copolymer, and a bulk polymerized ABS ("BABS") copolymer. In a still further aspect, the impact modifier component comprises an acrylonitrile butadiene styrene ("ABS") copolymer. In a yet further aspect, the impact modifier component comprises a methacrylate butadiene styrene ("MBS") copolymer. In an even further aspect, the impact modifier component comprises a bulk polymerized ABS ("BABS") copolymer.

In a further aspect, the impact modifier component is present in an amount from about 10 wt % to about 25 wt %. In a still further aspect, the impact modifier component is present in an amount from about 12 wt % to about 25 wt %. In a yet further aspect, the impact modifier component is present in an amount from about 13 wt % to about 25 wt %. In an even further aspect, the impact modifier component is present in an amount from about 14 wt % to about 25 wt %. In a still further aspect, the impact modifier component is present in an amount from about 15 wt % to about 25 wt %. In a yet further aspect, the impact modifier component is present in an amount from about 16 wt % to about 25 wt %. In an even further aspect, the impact modifier component is present in an amount from about 17 wt % to about 25 wt %.

In a further aspect, the impact modifier component is present in an amount from about 10 wt % to about 22 wt %. In a still further aspect, the impact modifier component is present in an amount from about 12 wt % to about 22 wt %. In a yet further aspect, the impact modifier component is present in an amount from about 13 wt % to about 22 wt %. In an even further aspect, the impact modifier component is present in an amount from about 14 wt % to about 22 wt %. In a still further aspect, the impact modifier component is present in an amount from about 15 wt % to about 22 wt %. In a yet further aspect, the impact modifier component is present in an amount from about 16 wt % to about 22 wt %. In an even further aspect, the impact modifier component is present in an amount from about 17 wt % to about 22 wt %.

In a further aspect, the impact modifier component is present in an amount from about 10 wt % to about 20 wt %. In a still further aspect, the impact modifier component is present in an amount from about 12 wt % to about 20 wt %. In a yet further aspect, the impact modifier component is present in an amount from about 13 wt % to about 20 wt %. In an even further aspect, the impact modifier component is present in an amount from about 14 wt % to about 20 wt %. In a still further aspect, the impact modifier component is present in an amount from about 15 wt % to about 20 wt %. In a yet further aspect, the impact modifier component is present in an amount from about 16 wt % to about 20 wt %. In an even further aspect, the impact modifier component is present in an amount from about 17 wt % to about 20 wt %.

In a further aspect, the impact modifier component is present in an amount from about 10 wt % to about 18 wt %. In a still further aspect, the impact modifier component is present in an amount from about 12 wt % to about 18 wt %. In a yet further aspect, the impact modifier component is present in an amount from about 13 wt % to about 18 wt %. In an even further aspect, the impact modifier component is present in an amount from about 14 wt % to about 18 wt %. In a still further aspect, the impact modifier component is present in an amount from about 15 wt % to about 18 wt %. In a yet further aspect, the impact modifier component is present in an amount from about 16 wt % to about 18 wt %. In an even further aspect, the impact modifier component is present in an amount from about 17 wt % to about 18 wt %.

In a further aspect, the impact modifier component is present in an amount from about 10 wt % to about 17 wt %. In a still further aspect, the impact modifier component is present in an amount from about 12 wt % to about 17 wt %. In a yet further aspect, the impact modifier component is present in an amount from about 13 wt % to about 17 wt %. In an even further aspect, the impact modifier component is present in an amount from about 14 wt % to about 17 wt %. In a still further aspect, the impact modifier component is present in an amount from about 15 wt % to about 17 wt %. In a yet further aspect, the impact modifier component is present in an amount from about 16 wt % to about 17 wt %.

In one aspect, the disclosed blended polycarbonate compositions with decreased splay of the present invention comprise a bulk polymerized acrylonitrile-butadiene-styrene polymer, or BABS polymer (which can be alternatively referred as a BABS component of the composition or simply BABS). In a further aspect, the disclosed blended polycarbonate compositions comprise a BABS component and a second impact modifier component. In a still further aspect, the disclosed blended polycarbonate compositions comprise at least one impact modifier, wherein the at least one impact modifier is BABS. In a yet further aspect, the disclosed blended polycarbonate compositions comprise two impact modifiers, that is, a first impact modifier component is BABS and a second impact modifier component.

Bulk polymerized ABS (BABS) (e.g., bulk polymerized ABS graft copolymer) comprises an elastomeric phase comprising one or more unsaturated monomers, such as butadiene having a Tg of less than or equal to 10° C., and a polymeric graft phase (e.g., rigid graft phase) comprising a copolymer of one or more monovinylaromatic monomers such as styrene and one or more unsaturated nitrile monomers, such as acrylonitrile having a Tg greater than 50° C. Rigid generally means a Tg greater than room temperature, e.g., a Tg greater than about 21° C. Bulk polymerized ABS can be prepared by first providing the elastomeric polymer, then polymerizing the constituent monomers of the rigid graft phase in the presence of the elastomer to obtain the elastomer modified copolymer. As the rigid graft phase copolymer molecular weight increases, a phase inversion occurs in which some of the rigid graft phase copolymer will be entrained within the elastomeric phase. Some of the grafts can be attached as graft branches to the elastomer phase.

Polybutadiene homopolymer can be used as the elastomer phase. Alternatively, the elastomer phase of the bulk polymerized ABS comprises butadiene copolymerized with up to about 25 wt. % of another conjugated diene monomer with a structure represented by the formula:

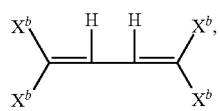

(8)

wherein each $X^b$ is independently $C_1$-$C_5$ alkyl. Examples of conjugated diene monomers that can be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. An example of a specific conjugated diene is isoprene.

The elastomeric butadiene phase can additionally be copolymerized with up to 25 wt %, specifically up to about 15 wt. %, of another comonomer, for example monovinylaromatic monomers containing condensed aromatic ring structures such as vinyl naphthalene, vinyl anthracene and the like, or monomers with a structure represented by the formula:

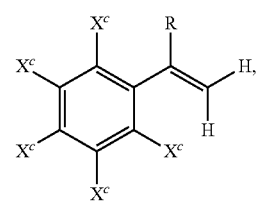

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In a further aspect, the butadiene is copolymerized with up to about 12 wt. %, specifically about 1 to about 10 wt. % styrene and/or alpha-methyl styrene.

Other monomers that can be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers generally with a structure represented by the formula:

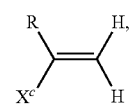

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and can be, for example about 0.01 to about 20 micrometers, specifically about 0.5 to about 10 micrometers, more specifically about 0.6 to about 1.5 micrometers can be used for bulk polymerized rubber substrates. Particle size can be measured by light transmission methods or capillary hydrodynamic chromatography (CHDF). The butadiene phase can provide about 5 to about 95 wt. % of the total weight of the ABS impact modifier copolymer, more specifically about 20 to about 90 wt. %, and even more specifically about 40 to about 85 wt. % of the ABS impact modifier, the remainder being the rigid graft phase.

The rigid graft phase comprises a copolymer formed from a styrenic monomer composition together with an unsaturated monomer comprising a nitrile group. As used herein, "styrenic monomer" includes monomers of formula (9) wherein each $X^c$ is independently hydrogen, $C_1$-$C_4$ alkyl, phenyl, $C_7$-$C_8$ aralkyl, $C_7$-$C_9$ alkaryl, $C_1$-$C_4$ alkoxy, phenoxy, chloro, bromo, or hydroxy, and R is hydrogen, $C_1$-$C_{12}$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostrene, dibromostyrene, tetra-chlorostyrene, and the like. Combinations comprising at least one of the foregoing styrenic monomers can be used.

Further as used herein, an unsaturated monomer comprising a nitrile group includes monomers of formula (10) wherein R is hydrogen, $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers can be used.

The rigid graft phase of the bulk polymerized ABS can further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (8). Specific comonomers include $C_1$-$C_4$ alkyl(meth)acrylates, for example methyl methacrylate.

The rigid copolymer phase will generally comprise about 10 to about 99 wt. %, specifically about 40 to about 95 wt. %, more specifically about 50 to about 90 wt. % of the styrenic monomer; about 1 to about 90 wt. %, specifically about 10 to about 80 wt. %, more specifically about 10 to about 50 wt. % of the unsaturated monomer comprising a nitrile group; and 0 to about 25 wt. %, specifically 1 to about 15 wt. % of other comonomer, each based on the total weight of the rigid copolymer phase.

The bulk polymerized ABS copolymer can further comprise a separate matrix or continuous phase of ungrafted rigid copolymer that can be simultaneously obtained with the ABS. The ABS can comprise about 40 to about 95 wt. % elastomer-modified graft copolymer and about 5 to about 65 wt. % rigid copolymer, based on the total weight of the ABS. In another embodiment, the ABS can comprise about 50 to about 85 wt. %, more specifically about 75 to about 85 wt. % elastomer-modified graft copolymer, together with about 15 to about 50 wt. %, more specifically about 15 to about 25 wt. % rigid copolymer, based on the total weight of the ABS.

A variety of bulk polymerization methods for ABS-type resins are known. In multizone plug flow bulk processes, a series of polymerization vessels (or towers), consecutively connected to each other, providing multiple reaction zones. The elastomeric butadiene can be dissolved in one or more of the monomers used to form the rigid phase, and the elastomer solution is fed into the reaction system. During the reaction, which can be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating can be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product.

In a further aspect, the impact modifier component is a bulk polymerized ABS copolymer present in an amount from about 10 wt % to about 25 wt %. In a still further aspect, the impact modifier component is a bulk polymerized ABS copolymer present in an amount from about 12 wt % to about 25 wt %. In a yet further aspect, the impact modifier component is a bulk polymerized ABS copolymer present in an amount from about 13 wt % to about 25 wt %. In an even further aspect, the impact modifier component is a bulk polymerized ABS copolymer present in an amount from about 14 wt % to about 25 wt %. In a still further aspect, the impact modifier component is a bulk polymerized ABS copolymer present in an amount from about 15 wt % to about 25 wt %. In a yet further aspect, the impact modifier component is a bulk polymerized ABS copolymer present in an amount from about 16 wt % to about 25 wt %. In an even further aspect, the impact modifier component is a bulk polymerized ABS copolymer present in an amount from about 17 wt % to about 25 wt %.

In a further aspect, the impact modifier component is a bulk polymerized ABS copolymer present in an amount from about 10 wt % to about 22 wt %. In a still further aspect, the impact modifier component is a bulk polymerized ABS copolymer present in an amount from about 12 wt % to about 22 wt %. In a yet further aspect, the impact modifier component is a bulk polymerized ABS copolymer present in an amount from about 13 wt % to about 22 wt %. In an even further aspect, the impact modifier component is a bulk polymerized ABS copolymer present in an amount from about 14 wt % to about 22 wt %. In a still further aspect, the impact modifier component is a bulk polymerized ABS copolymer present in an amount from about 15 wt % to about 22 wt %. In a yet further aspect, the impact modifier component is a bulk polymerized ABS copolymer present in an amount from about 16 wt % to about 22 wt %. In an even further aspect, the impact modifier component is a bulk polymerized ABS copolymer present in an amount from about 17 wt % to about 22 wt %.

In a further aspect, the impact modifier component is a bulk polymerized ABS copolymer present in an amount from about 10 wt % to about 20 wt %. In a still further aspect, the impact modifier component is a bulk polymerized ABS copolymer present in an amount from about 12 wt % to about 20 wt %. In a yet further aspect, the impact modifier component is a bulk polymerized ABS copolymer present in an amount from about 13 wt % to about 20 wt %. In an even further aspect, the impact modifier component is a bulk polymerized ABS copolymer present in an amount from about 14 wt % to about 20 wt %. In a still further aspect, the impact modifier component is a bulk polymerized ABS copolymer present in an amount from about 15 wt % to about 20 wt %. In a yet further aspect, the impact modifier component is a bulk polymerized ABS copolymer present in an amount from about 16 wt % to about 20 wt %. In an even further aspect, the impact modifier component is a bulk polymerized ABS copolymer present in an amount from about 17 wt % to about 20 wt %.

In a further aspect, the impact modifier component is a bulk polymerized ABS copolymer present in an amount from about 10 wt % to about 18 wt %. In a still further aspect, the impact modifier component is a bulk polymerized ABS copolymer present in an amount from about 12 wt % to about 18 wt %. In a yet further aspect, the impact modifier component is a bulk polymerized ABS copolymer present in an amount from about 13 wt % to about 18 wt %. In an even further aspect, the impact modifier component is a bulk polymerized ABS copolymer present in an amount from about 14 wt % to about 18 wt %. In a still further aspect, the impact modifier component is a bulk polymerized ABS copolymer present in an amount from about 15 wt % to about 18 wt %. In a yet further aspect, the impact modifier component is a bulk polymerized ABS copolymer present in an amount from about 16 wt % to about 18 wt %. In an even further aspect, the impact modifier component is a bulk polymerized ABS copolymer present in an amount from about 17 wt % to about 18 wt %.

In a further aspect, the impact modifier component is a bulk polymerized ABS copolymer present in an amount from about 10 wt % to about 17 wt %. In a still further aspect, the impact modifier component is a bulk polymerized ABS copolymer present in an amount from about 12 wt % to about 17 wt %. In a yet further aspect, the impact modifier component is a bulk polymerized ABS copolymer present in an amount from about 13 wt % to about 17 wt %. In an even further aspect, the impact modifier component is a bulk polymerized ABS copolymer present in an amount from about 14 wt % to about 17 wt %. In a still further aspect, the impact modifier component is a bulk polymerized ABS copolymer present in an amount from about 15 wt % to about 17 wt %. In a yet further aspect, the impact modifier component is a bulk polymerized ABS copolymer present in an amount from about 16 wt % to about 17 wt %.

In a further aspect, the bulk polymerized ABS copolymer has a butadiene content of from about 10 wt % to about 17 wt %. In a still further aspect, the bulk polymerized ABS copolymer has a butadiene content of from about 11 wt % to about 17 wt %. In a yet further aspect, the bulk polymerized ABS copolymer has a butadiene content of from about 12 wt % to about 17 wt %. In an even further aspect, the bulk polymerized ABS copolymer has a butadiene content of from about 13 wt % to about 17 wt %. In a still further aspect, the bulk polymerized ABS copolymer has a butadiene content of from about 14 wt % to about 17 wt %. In a yet further aspect, the bulk polymerized ABS copolymer has a butadiene content of from about 15 wt % to about 17 wt %.

In a further aspect, the bulk polymerized ABS copolymer has a butadiene content of from about 10 wt % to about 16 wt %. In a still further aspect, the bulk polymerized ABS copolymer has a butadiene content of from about 11 wt % to about 16 wt %. In a yet further aspect, the bulk polymerized ABS copolymer has a butadiene content of from about 12 wt % to about 16 wt %. In an even further aspect, the bulk polymerized ABS copolymer has a butadiene content of from about 13 wt % to about 16 wt %. In a still further aspect, the bulk polymerized ABS copolymer has a butadiene content of from about 14 wt % to about 16 wt %. In a yet further aspect, the bulk polymerized ABS copolymer has a butadiene content of from about 15 wt % to about 16 wt %.

In a further aspect, the bulk polymerized ABS copolymer has an acrylonitrile content of from about 11 wt % to about 22 wt %. In a still further aspect, the bulk polymerized ABS copolymer has an acrylonitrile content of from about 11 wt % to about 21 wt %. In a yet further aspect, the bulk polymerized ABS copolymer has an acrylonitrile content of from about 11 wt % to about 20 wt %. In an even further aspect, the bulk polymerized ABS copolymer has an acrylonitrile content of from about 11 wt % to about 19 wt %. In a still further aspect, the bulk polymerized ABS copolymer has an acrylonitrile content of from about 11 wt % to about 18 wt %. In a yet further aspect, the bulk polymerized ABS copolymer has an acrylonitrile content of from about 11 wt % to about 17 wt %. In an even further aspect, the bulk polymerized ABS copolymer has an acrylonitrile content of from about 11 wt % to about 16 wt %. In a still further aspect, the bulk polymerized ABS copolymer has an acrylonitrile content of from about 11 wt % to about 15 wt %. In a yet further aspect, the bulk polymerized ABS copolymer has an acrylonitrile content of from about 11 wt % to about 14 wt %. In an even further aspect, the bulk polymerized ABS copolymer has an acrylonitrile content of from about 11 wt % to about 13 wt %.

In a further aspect, the bulk polymerized ABS copolymer has an acrylonitrile content of from about 12 wt % to about 22 wt %. In a still further aspect, the bulk polymerized ABS copolymer has an acrylonitrile content of from about 12 wt % to about 21 wt %. In a yet further aspect, the bulk polymerized ABS copolymer has an acrylonitrile content of from about 12 wt % to about 20 wt %. In an even further aspect, the bulk polymerized ABS copolymer has an acrylonitrile content of from about 12 wt % to about 19 wt %. In a still further aspect, the bulk polymerized ABS copolymer has an acrylonitrile content of from about 12 wt % to about 18 wt %. In a yet further aspect, the bulk polymerized ABS copolymer has an acrylonitrile content of from about 12 wt % to about 17 wt %. In an even further aspect, the bulk polymerized ABS copolymer has an acrylonitrile content of from about 12 wt % to about 16 wt %. In a still further aspect, the bulk polymerized ABS copolymer has an acrylonitrile content of from about 12 wt % to about 15 wt %. In a yet further aspect, the bulk polymerized ABS copolymer has an acrylonitrile content of from about 12 wt % to about 14 wt %. In an even further aspect, the bulk polymerized ABS copolymer has an acrylonitrile content of from about 12 wt % to about 13 wt %.

In a further aspect, the bulk polymerized ABS copolymer ("BABS") has a weight average molecular weight from about 100,000 g/mol to about 190,000 g/mol when determined by gel permeation chromatography relative to traceable polystyrene standards. In reference to the weight average molecular weight (Mw) of the impact modifier component, including the bulk polymerized ABS, of the present invention, it is understood that the $M_w$ is the relative $M_w$ determined by gel permeation chromatography relative to traceable polystyrene standards.

Optional Thermoplastic Composition Additives

The disclosed thermoplastic composition optionally comprises one or more additives conventionally used in the manufacture of molded thermoplastic parts with the proviso that the optional additives do not adversely affect the desired properties of the resulting composition. Mixtures of optional additives can also be used. Such additives may be mixed at a suitable time during the mixing of the components for forming the composite mixture. For example, the disclosed composition optionally comprises one or more additional fillers, plasticizers, stabilizers, anti-static agents, flame-retardants, impact modifiers, colorant, antioxidant, and/or mold release agents. In one aspect, the composition further comprises one or more optional additives selected from an antioxidant, flame retardant, inorganic filler, and stabilizer.

Exemplary heat stabilizers include, for example, organo phosphites such as triphenyl phosphite, tris-(2,6-dimethyl-phenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include either a primary or a secondary antioxidant. For example, antioxidants include organophosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

The disclosed thermoplastic compositions can further comprise an additional filler, such as, for example, an inorganic filler or reinforcing agent. The specific composition of a filler, if present, can vary, provided that the filler is chemically compatible with the remaining components of the thermoplastic composition. In one aspect, the thermoplastic composition comprises a mineral filler. In another aspect, the thermoplastic composition comprises a filler comprising talc. If present, the amount of filler can comprise any amount suitable for the thermoplastic composition that does not adversely affect the desired properties thereof.

In another aspect, the filler can comprise silicates and silica powders, such as aluminum silicate (mullite), synthetic calcium silicate, zirconium silicate, fused silica, crystalline silica graphite, natural silica sand, or the like; boron powders, such as boron-nitride powder, boron-silicate powders, or the like; oxides, such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In one aspect, the thermoplastic composition comprises an additional filler comprising a glass fiber, a glass bead, a flame retardant, a process aid, or a stabilizer, or a combination thereof. In another aspect, the additional filler comprises glass fibers. In a further aspect, the additional filler comprises glass fibers wherein the glass fiber has a cross section that is round or flat. In a yet further aspect, the glass fiber, for example, can be Nittobo (flat) glass fiber, CSG3PA820. In an even further aspect, the glass bead has a cross section that is round or flat.

In one aspect, the disclosed composition can comprises from greater than 0% to about 70 wt % of an additional filler including or example, about 5, 10, 15, 20, 25, 30, 35, 40, 45, 50, 55, 60, or 65 weight %. In still further aspects, the additional filler can be present in any range of amounts derived from the above values. For example, the additional filler can be present in the polycarbonate composition in an amount in the range of from about 40 weight % to about 60 weight %, or even from about 45 weight percent to about 55 weight %.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing may be used in a polymeric resin containing chemical antistatic agents to render the composition electrostatically dissipative.

Exemplary mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3, 3-diphenylacryloyl) oxy]methyl]propane (UVINUL™ 3030); 2,2'-(1,4-phenylene) bis(4H-3,1-benzoxazin-4-one); 1,3-bis[(2-cyano-3, 3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

As noted above, the disclosed thermoplastic composition can optionally further comprise a flame retardant additive. In various aspects, the flame retardant additive can comprise any flame retardant material or mixture of flame retardant materials suitable for use in the inventive thermoplastic compositions. In another aspect, the flame retardant additive comprises a phosphate containing material. In another aspect, the flame retardant additive comprises a halogen containing material. In other aspects, the flame retardant additive is free of or substantially free of one or more of phosphate and/or a halogen. In still another aspect, the flame retardant additive comprises an oligomer organophosphorous flame retardant, including for example, bisphenol A diphenyl phosphate (BPADP). In a further aspect, the flame retardant is selected from oligomeric phosphate, polymeric phosphate, oligomeric phosphonate, ammonium polyphosphate (Exolit OP) or mixed phosphate/phosphonate ester flame retardant compositions. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

The concentration of a flame retardant additive can vary, and the present invention is not intended to be limited to any particular flame retardant concentration. In one aspect, the disclosed composition can comprises from greater than 0% to about 20 wt % of flame retardant additive, including or example, about 1, 2, 3, 4, 5, 6, 7, 8, 9, 10, 11, 12, 13, 14, 15, 16, 17, 18, or 19 weight %. In still further aspects, the flame retardant additive can be present in any range of amounts derived from the above values. For example, the flame retardant additive can be present in the polycarbonate composition in an amount in the range of from about 5 weight % to about 15 weight %, or even from about 10 weight percent to about 20 weight %. Flame retardant additives are commercially available, and one of skill in the art could readily select an appropriate flame retardant additive.

Additionally, materials to improve flow and other properties may be added to the composition, such as low molecular weight hydrocarbon resins. These materials are also known as process aids. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Performance Properties

As noted previously, the thermoplastic composition disclosed herein can provide improved performance properties compared to that of conventional LDS thermoplastic compositions. For example, the disclosed compositions can provide robust plating performance while maintaining good mechanical properties (e.g., Izod impact strength higher than about 400 J/m). Evaluation of the mechanical properties can be performed through various tests, such as Izod test, Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

The disclosed thermoplastic compositions can exhibit, for example, improved mechanical, thermal, and/or morphological properties. Further, for example, the thermoplastic compositions may show improved ductility and improved impact strength. Even further for example, the thermoplastic compositions may show improved ductility and improved impact strength without adversely affecting other mechanical and thermal properties.

A. Exemplary Performance Properties with Polycarbonates

According to aspects of the disclosure, a molded article formed from the disclosed thermoplastic compositions can exhibit a notched Izod impact energy at 23'C of at least 800 J/m. In further aspects, a molded article formed from a disclosed thermoplastic composition can exhibit a notched Izod impact energy at 23'C in the range of from 830 J/m to 900 J/m, including exemplary impact energy values of 830 J/m, 840 J/m, 850 J/m, 860 J/m, 870 J/m, 880 J/m, 890 J/m, 900 J/m. In still further aspects, a molded article formed from a disclosed thermoplastic composition can exhibit a notched Izod impact energy at 23° C. in any range derived from any two values set forth above. For example, the notched Izod impact energy can be in the range of from 840 J/m to 870 J/m.

In still further aspects, molded articles formed from the disclosed thermoplastic compositions can exhibit desirable values of percent elongation at yield. For example, according to aspects, a molded article formed from the disclosed thermoplastic compositions can exhibit an elongation at yield in the range of from 5% to 30%, including exemplary values of 6%, 7%, 8%, 9%, 10%, 11%, 12%, 13%, 14%, 15%, 16%, 17%, 18%, 19%, 20%, 21% 22%, 23%, 24%, 25%, 26%, 27%, 28%, and 29%. In still further aspects, the elongation at yield percentage can be in a range derived from any two of the above listed exemplary elongation at break percentages. For example, the elongation at break can be in the range of from 5% to 6%.

In yet further aspects, molded articles formed from the disclosed thermoplastic compositions can exhibit desirable values of percent elongation at break. For example, according to aspects, a molded article formed from the disclosed thermoplastic compositions can exhibit an elongation at break in the range of from 60% to 80%, including exemplary values of 61%, 62%, 63%, 64%, 65%, 66%, 67% 68%, 69%, 70%, 71%, 72%, 73%, 74%, 75%, 76%, 77%, 78%, and 79%. In still further aspects, the elongation at break percentage can be in a range derived from any two of the above listed exemplary elongation at break percentages. For example, the elongation at break can be in the range of from 70% to 72%.

In still further aspects, molded articles formed from the disclosed thermoplastic compositions can exhibit desirable values of plating index. For example, according to aspects, a molded article formed from the disclosed thermoplastic compositions can exhibit a plating index in the range of from 0.75 to 1, including exemplary values of 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, and 0.99. In still further aspects, the plating index can be in a range derived from any two of the above listed exemplary plating indexes. For example, the plating index can be in the range of from 0.80 to 0.95.

In yet further aspects, molded articles formed from the disclosed thermoplastic compositions can exhibit desirable values of ash. For example, according to aspects, a molded article formed from the disclosed thermoplastic compositions can exhibit an ash percentage in the range of from 1% to 10%, including exemplary values of 2%, 3%, 4%, 5%, 6%, 7%, 8%, and 9%. In still further aspects, the ash can be in a range derived from any two of the above listed exemplary ash values. For example, the ash can be in the range of from 6% to 8%.

In still further aspects, molded articles formed from the disclosed thermoplastic compositions can exhibit desirable values of melt volume rate (MVR) (measured at 300° C., 1.2 kg, 360s). For example, according to aspects, a molded article formed from the disclosed thermoplastic compositions can exhibit a MVR in the range of from 5 cm$^3$/10 min to 20 cm$^3$/10 min, including exemplary values of 6 cm$^3$/10 min, 7 cm$^3$/10 min, 8 cm$^3$/10 min, 9 cm$^3$/10 min, 10 cm$^3$/10 min, 11 cm$^3$/10 min, 12 cm$^3$/10 min, 13 cm$^3$/10 min, 14 cm$^3$/10 min, 15 cm$^3$/10 min, 16 cm$^3$/10 min, 17 cm$^3$/10 min, 18 cm$^3$/10 min, and 19 cm$^3$/10 min. In still further aspects, the MVR can be in a range derived from any two of the above listed exemplary MVR values. For example, the MVR can be in the range of from 13 cm$^3$/10 min to 14 cm$^3$/10 min.

In still further aspects, molded articles formed from the disclosed thermoplastic compositions can exhibit desirable values of density. For example, according to aspects, a molded article formed from the disclosed thermoplastic composition can exhibit a density in the range of from 1.2 to 1.3 g/cm$^3$, including exemplary values of 1.21 g/cm$^3$, 1.22 g/cm$^3$, 1.23 g/cm$^3$, 1.24 g/cm$^3$, 1.25 g/cm$^3$, 1.26 g/cm$^3$, 1.27 g/cm$^3$, 1.28 g/cm$^3$, and 1.29 g/cm$^3$. In still further aspects, the density can be in a range derived from any two of the above listed exemplary density values. For example, the density can be in the range of from 1.24 g/cm$^3$ to 1.27 g/cm$^3$.

In yet further aspects, molded articles formed from the disclosed thermoplastic compositions can exhibit desirable values of heat deflection temperature (HDT). For example, according to aspects, a molded article formed from the disclosed thermoplastic composition can exhibit a HDT in the range of from 115° C. to 130° C., including exemplary values of 116° C., 117° C., 118° C., 119° C., 120° C., 121° C., 122° C., 123° C., 124° C., 125° C., 126° C., 127° C., 128° C., and 129° C. In still further aspects, the HDT can be in a range derived from any two of the above listed exemplary HDT values. For example, the HDT can be in the range of from 122° C. to 125° C.

In still further aspects, molded articles formed from the disclosed thermoplastic compositions can exhibit desirable values of flexural modulus. For example, according to aspects, a molded article formed from the disclosed thermoplastic composition can exhibit a flexural modulus in the range of from 2380 MPa to 2480 MPa, including exemplary values of 2390 MPa, 2400 MPa, 2410 MPa, 2420 MPa, 2430 MPa, 2440 MPa, 2450 MPa, 2460 MPa, and 2470 MPa. In still further aspects, the flexural modulus can be in a range derived from any two of the above listed exemplary flexural modulus values. For example, the flexural modulus values can be in the range of from 2390 MPa to 2470 MPa.

In still further aspects, molded articles formed from the disclosed thermoplastic compositions can exhibit desirable values of flexural stress at yield. For example, according to aspects, a molded article formed from the disclosed thermoplastic composition can exhibit a flexural stress at yield in the range of from 85 MPa to 95 MPa, including exemplary values of 86 MPa, 87 MPa, 88 MPa, 89 MPa, 90 MPa, 91 MPa, 92 MPa, 93 MPa, and 94 MPa. In still further aspects, the flexural stress at yield can be in a range derived from any two of the above listed exemplary flexural stress at yield values. For example, the flexural stress at yield can be in the range of from 89 MPa to 91 MPa.

In still further aspects, molded articles formed from the disclosed thermoplastic compositions can exhibit desirable values of modulus of elasticity. For example, according to aspects, a molded article formed from the disclosed thermoplastic composition can exhibit a modulus of elasticity in the range of from 2380 MPa to 2550 MPa, including exemplary values of 2390 MPa, 2400 MPa, 2410 MPa, 2420 MPa, 2430 MPa, 2440 MPa, 2450 MPa, 2460 MPa, 2470 MPa, 2480 MPa, 2490 MPa, 2500 MPa, 2510 MPa, 2520 MPa, 2530 MPa, and 2540 MPa. In still further aspects, the modulus of elasticity can be in a range derived from any two of the above listed exemplary modulus of elasticity values. For example, the modulus of elasticity can be in the range of from 2410 MPa to 2530 MPa.

In still further aspects, molded articles formed from the disclosed thermoplastic composition can exhibit desirable values of stress at yield. For example, according to aspects, a molded article formed from the disclosed thermoplastic composition can exhibit stress at yield in the range of from 55 MPa to 65 MPa, including exemplary values of 56 MPa, 57 MPa, 58 MPa, 59 MPa, 60 MPa, 61 MPa, 62 MPa, 63 MPa, and 64 MPa. In still further aspects, the stress at yield can be in a range derived from any two of the above listed exemplary stress at yield values. For example, the stress at yield can be in the range of from 57 MPa to 59 MPa.

In still further aspects, molded articles formed from the disclosed thermoplastic composition can exhibit desirable values of stress at break. For example, according to aspects, a molded article formed from the disclosed thermoplastic composition can exhibit stress at break in the range of from 48 MPa to 60 MPa, including exemplary values of 49 MPa, 50 MPa, 51 MPa, 52 MPa, 53 MPa, 54 MPa, 55 MPa, 56 MPa, 57 MPa, 58 MPa, and 59 MPa. In still further aspects, the stress at break can be in a range derived from any two of the above listed exemplary stress at break values. For example, the stress at break can be in the range of from 52 MPa to 53 MPa.

B. Exemplary Performance Properties with Polyamides

In still further aspects, molded articles formed from the disclosed thermoplastic composition can exhibit desirable values of density. For example, according to aspects, a molded article formed from the disclosed thermoplastic composition can exhibit density in the range of from 1.60 g/cm$^3$ to 1.70 g/cm$^3$, including exemplary values of 1.61 g/cm$^3$, 1.62 g/cm$^3$, 1.63 g/cm$^3$, 1.64 g/cm$^3$, 1.65 g/cm$^3$, 1.66 g/cm$^3$, 1.67 g/cm$^3$, 1.68 g/cm$^3$, and 1.69 g/cm$^3$. In still further aspects, the density can be in a range derived from any two of the above listed exemplary density values. For example, the density can be in the range of from 1.61 g/cm$^3$ to 1.63 g/cm$^3$.

In still further aspects, molded articles formed from the disclosed thermoplastic composition can exhibit desirable values of tensile modulus. For example, according to aspects, a molded article formed from the disclosed thermoplastic composition can exhibit tensile modulus in the range of from 15600 MPa to 15700 MPa, including exemplary values of 15610 MPa, 15620 MPa, 15630 MPa, 15640 MPa, 15650 MPa, 15660 MPa, 15670 MPa, 15680 MPa, and 15690 MPa. In still further aspects, the tensile modulus can be in a range derived from any two of the above listed exemplary tensile modulus. For example, the tensile modulus can be in the range of from 15620 MPa to 15690 MPa.

In still further aspects, molded articles formed from the disclosed thermoplastic composition can exhibit desirable values of tensile strength. For example, according to aspects, a molded article formed from the disclosed thermoplastic composition can exhibit tensile strength in the range of from 170 MPa to 180 MPa, including exemplary values of 171 MPa, 172 MPa, 173 MPa, 174 MPa, 175 MPa, 176 MPa, 177 MPa, 178 MPa, and 179 MPa. In still further aspects, the tensile strength can be in a range derived from any two of the above listed exemplary tensile strength. For example, the tensile strength can be in the range of from 172 MPa to 178 MPa.

In still further aspects, molded articles formed from the disclosed thermoplastic composition can exhibit desirable values of tensile elongation. For example, according to aspects, a molded article formed from the disclosed thermoplastic composition can exhibit tensile elongation in the range of from 2.00% to 2.15%, including exemplary values of 2.01%, 2.02%, 2.03%, 2.04%, 2.05%, 2.06%, 2.07%, 2.08%, 2.09%, 2.10%, 2.11%, 2.12%, 2.13%, 2.14%. In still further aspects, the tensile elongation can be in a range derived from any two of the above listed exemplary tensile elongation. For example, the tensile elongation can in the range of from 2.05% to 2.1%.

In still further aspects, molded articles formed from the disclosed thermoplastic composition can exhibit desirable values of unnotched izod (23° C., 51 bf/ft). For example, according to aspects, a molded article formed from the disclosed thermoplastic composition can exhibit unnotched izod in the range of from 650 J/m to 720 J/m, including exemplary values of 660 J/m, 670 J/m, 680 J/m, 690 J/m, 700 J/m, and 710 J/m. In still further aspects, the unnotched izod can be in a range derived from any two of the above listed exemplary unnotched izod values. For example, the unnotched izod can in the range of from 650 J/m to 710 J/m.

In still further aspects, molded articles formed from the disclosed thermoplastic composition can exhibit desirable values of dielectric constant (Dk). For example, according to aspects, a molded article formed from the disclosed thermoplastic composition can exhibit Dk in the range of from 4.10 to 4.20, including exemplary values of 4.11, 4.12, 4.13, 4.14, 4.15, 4.16, 4.17, 4.18, and 4.19. In still further aspects, the Dk can be in a range derived from any two of the above listed exemplary Dk values. For example, the Dk can be in the range of from 4.12 to 4.17.

In still further aspects, molded articles formed from the disclosed thermoplastic composition can exhibit desirable values of Dissipation factor (Df). For example, according to aspects, a molded article formed from the disclosed thermoplastic composition can exhibit Df in the range of 0.010 to 0.020, including exemplary values of 0.011, 0.012, 0.013, 0.014, 0.015, 0.016, 0.017, 0.018, and 0.019. In still further aspects, the Df can be in a range derived from any two of the above listed exemplary Df values. For example, the Df can be in the range of from 0.012 to 0.014.

Methods of Manufacture

The disclosed compositions comprising the above-described components can be manufactured according to any conventionally known methods of preparing thermoplastic polymer compositions for laser direct structuring (LDS). For example, a thermoplastic polymer resin and a laser direct structuring (LDS) additive can be combined to provide a composition mixture wherein the LDS additive is at least substantially dispersed within the thermoplastic polymer resin phase. The LDS additive and the resin can be combined, for example, by using conventional extrusion techniques.

As described herein, the present invention relates to polymer compositions. The polymer compositions of the present disclosure can be formed using any known method of combining multiple components to form a thermoplastic resin. In one aspect, the components are first blended in a high-speed mixer. Other low shear processes including but not limited to hand mixing can also accomplish this blending. The blend is then fed into the throat of a twin-screw extruder via a hopper. Alternatively, one or more of the components can be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate can be one-fourth inch long or less as desired. Such pellets can be used for subsequent molding, shaping, or forming. In one aspect, the blend composition is formed by extrusion blending.

According to various aspects, methods for manufacturing the present compositions generally comprise providing a thermoplastic polymer or polymer composition as described herein; providing a laser direct structuring additive; and combining the provided polymer or polymer composition and provided laser direct structure additive to provide a resulting composition.

In one exemplary aspect, disclosed is a method for the manufacture of a polymer composition comprising the steps of: a) providing a first polycarbonate polymer; b) providing a laser direct structuring additive; and c) combining the first polycarbonate polymer and laser direct structuring additive to form a polymer composition; wherein the laser direct structuring additive comprises a mean particle size of equal to or less than 1 μm.

In another exemplary aspect, disclosed is a method for the manufacture of a polymer composition comprising the steps of: a) providing a polyamide polymer; b) providing a laser direct structuring additive; and c) combining the polyamide polymer and laser direct structuring additive to form a polymer composition; wherein the laser direct structuring additive comprises a mean particle size of equal to or less than 1 μm.

In yet another exemplary aspect, disclosed is a method for the manufacture of a polymer composition comprising the steps of: a) providing a thermoplastic polymer; b) providing a laser direct structuring additive; and c) combining the thermoplastic polymer and laser direct structuring additive to form a polymer composition; wherein the laser direct structuring additive comprises a mean particle size of equal to or less than 1 μm.

In various aspects, the invention also relates to methods of forming compositions and articles from the disclosed compositions. In a further aspect, the methods comprise forming an article from the disclosed compositions using laser direct structuring (LDS). In a still further aspect, the laser direct structuring process generally involves three steps: 1) injection molding, 2) laser structuring, and 3) metallizing. In a yet further aspect, the LDS process may be, for example, the LDS process from the company LPKF.

In a further aspect, at least one filler composition may be mixed with a polymer matrix during the injection molding step. In a still further aspect, single shot injection molding can be used to produce the parts or articles to be laser structured. In at least one aspect, the thermoplastic composition may be mixed at this step and used in the LDS process. In another aspect, additional ingredients may be added to the thermoplastic composition after this step.

In a further aspect, a laser is used to form a conductive path. In a still further aspect, the laser used to form a conductive path is laser direct structuring. In a yet further aspect, laser direct structuring comprises laser etching. In an even further aspect, laser etching is carried out to provide an activated surface.

In a further aspect, at least one laser beam draws at least one pattern on the surface of the thermoplastic composition during the laser structuring step. In a still further aspect, the employed filler composition may release at least one metallic nucleus. In a yet further aspect, the at least one metallic nucleus that has been released may act as a catalyst for reductive copper plating process.

In a further aspect, laser etching is carried out at about 1 w to about 10 w power with a frequency from about 30 kHz to about 110 kHz and a speed of about 1 m/s to about 5 m/s. In a still further aspect, laser etching is carried out at about 1 w to about 10 w power with a frequency from about 40 kHz to about 100 kHz and a speed of about 2 m/s to about 4 m/s. In a yet further aspect, laser etching is carried out at about 3.5 w power with a frequency of about 40 kHz and a speed of about 2 m/s.

In a further aspect, a rough surface may form in the LDS process. In a still further aspect, the rough surface may entangle the copper plate with the polymer matrix in the thermoplastic composition, which may provide adhesion between the copper plate and the thermoplastic composition.

The metalizing step may, in various aspects, be performed using conventional techniques. For example, in one aspect, an electroless copper plating bath is used during the metallization step in the LDS process. Thus, in various aspects, plating a metal layer onto a conductive path is metallization. In a still further aspect, metallization can comprise the steps: a) cleaning the etched surface; b) additive build-up of tracks; and c) plating.

Articles of Manufacture

Shaped, formed, or molded articles including the thermoplastic compositions are also provided. The thermoplastic compositions can be molded into useful shaped articles by a variety of means such as injection molding, extrusion, rotational molding, blow molding and thermoforming to form articles such as, for example, personal computer, notebook and portable computer, cell phone antenna and other such communication equipment, medical application, RFID application, automotive application, and the like.

In a further aspect, the molded article further comprises a conductive path formed by activation with a laser. In a yet further aspect, the article further comprises a metal layer plated onto the conductive path. In an even further aspect, the metal layer is a copper layer. In a still further aspect, the metal layer has a thickness of about 0.8 micrometers or higher as measured according to ASTM B568.

As described above, 3D MIDs may allow the integration of electrical and mechanical elements into a variety of differently shaped interconnected devices. By allowing integration into these different shapes, 3D MIDs allow new functions to be created.

Laser-supported or directed structuring process (LDS) for 3D MIDs simplifies the manufacturing process. The laser may, for example, have a resolution of <0.1 mm. The laser may produce fine structures and remove material from plastic surfaces. The LDS process may be performed by using a thermoplastic composition.

In various aspects, the 3D MIDs, LDS process, or thermoplastic composition may be used in the field of electronics. In a further aspect, non-limiting examples of fields which may use 3D MIDs, LDS process, or thermoplastic composition include electrical, electro-mechanical, Radio Frequency (RF) technology, telecommunication, automotive, aviation, medical, sensor, military, and security. In a still further aspect, the use of 3D MIDs, LDS processes, or thermoplastic compositions may also be present in overlapping fields, for example in mechatronic systems that integrate mechanical and electrical properties which may, for example, be used in automotive or medical engineering.

In one aspect, molded articles according to the present invention can be used to produce a device in one or more of the foregoing fields. In a still further aspect, non-limiting examples of such devices in these fields which may use 3D MIDs, LDS processes, or thermoplastic compositions according to the present invention include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a still further aspect, the molded articles can be used to manufacture devices in the automotive field. In a further aspect, non-limiting examples of such devices in the automotive field which may use 3D MIDs, LDS processes, or the disclosed thermoplastic compositions in the vehicle's interior include adaptive cruise control, headlight sensors, windshield wiper sensors, and door/window switches. In a further aspect, non-limiting examples of devices in the automotive field which may use 3D MIDs, LDS process, or the disclosed thermoplastic compositions in the vehicle's exterior include pressure and flow sensors for engine management, air conditioning, crash detection, and exterior lighting fixtures.

Plastic plating was developed for industrial application because of the low cost, the ability to mold large and complex parts, and the reduction of weight. Plastic plating also allows the rapid development of new designs and reduced space requirements in both production and the devices themselves. As gasoline prices rise, consumers have become more interested in automotive weight reduction. Non-limiting examples of plastic materials which may be plated include acrylonitrile butadiene styrene (ABS), polypropylene, polysulfone, polyethersulfone, polyetherimide, Teflon, polyarylether, polycarbonate, polyphenylene oxide, polyacetel. The LDS process may be used for plastic plating and the plastic material may be included in the thermoplastic composition or in the polymer matrix of the thermoplastic composition.

In one aspect, the molded articles may have a thickness ranging from 1.2 mm to 3.5 mm, including exemplary values of 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, and 3.4 mm. In still further aspects, the thickness can be in a range derived from any two of the above listed exemplary thickness values. For example, the thickness can be in the range of from 1.2 mm to 2.0 mm, or from 2.8 mm to 3.5 mm.

In a further aspect, the resulting disclosed compositions can be used to provide any desired shaped, formed, or molded articles. For example, the disclosed compositions may be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

The disclosed compositions, methods, and articles include at least the following aspects.

Aspect 1: A polymer composition comprising:
(a) a first polycarbonate polymer; and
(b) a laser direct structuring additive,
wherein the laser direct structuring additive comprises a mean particle size of equal to or less than 1 μm.

Aspect 2: The polymer composition of aspect 1, wherein the polymer composition further comprises a polycarbonate-polysiloxane copolymer.

Aspect 3: The polymer composition of any of aspects 1-2, wherein the polymer composition further comprises a second polycarbonate polymer.

Aspect 4: The polymer composition of aspect 3, wherein the second polycarbonate polymer comprises a branched polycarbonate.

Aspect 5: The polymer composition of any of aspects 1-4, wherein the polymer composition further comprises a supporting material.

Aspect 6: The polymer composition of any of aspects 5, wherein the supporting material acts as a carrier or improves the performance of the polymer composition, or a combination thereof.

Aspect 7: The polymer composition of any of aspects 1-6, wherein the polymer composition further comprises a flame retardant additive.

Aspect 8: The polymer composition of aspect 7, wherein the flame retardant additive comprises BPADP or phosphazene, or a combination thereof.

Aspect 9: The polymer composition of any of aspects 1-8, wherein the polymer composition further comprises a reinforcing filler.

Aspect 10: The polymer composition of aspect 9, wherein the reinforcing filler comprises a glass fiber, a carbon fiber, or a mineral filler, or a combination thereof.

Aspect 11: The polymer composition of aspect 9, wherein the reinforcing filler is selected from the group consisting of a glass fiber, a carbon fiber, and a mineral filler.

Aspect 12: The polymer composition of any of aspects 1-11, wherein the polymer composition is capable of being activated by a laser.

Aspect 13: The polymer composition of any of aspects 1-12, wherein the polymer composition is capable of being molded into an article.

Aspect 14: The polymer composition of any of aspects 1-13, wherein the polymer composition demonstrates a flexural modulus in an amount equal to or greater than 3 GPa.

Aspect 15: The polymer composition of any of aspects 1-14, wherein the polymer composition demonstrates a tensile modulus in an amount equal to or greater than 3 GPa.

Aspect 16: A polymer composition comprising:
(a) a polyamide polymer; and
(b) a laser direct structuring additive,
  wherein the laser direct structuring additive comprises a mean particle size of equal to or less than 1 μm.

Aspect 17: The polymer composition of aspect 16, wherein the polymer composition further comprises a flame retardant additive.

Aspect 18: The polymer composition of aspect 17, wherein the flame retardant additive comprises Exolit OP.

Aspect 19: The polymer composition of any of aspects 16-18, wherein the polymer composition further comprises a reinforcing filler.

Aspect 20: The polymer composition of any of aspects 19, wherein the reinforcing filler comprises a glass fiber, a carbon fiber, or a mineral filler, or a combination thereof.

Aspect 21: The polymer composition of any of aspects 19, wherein the reinforcing filler is selected from the group consisting of a glass fiber, a carbon fiber, and a mineral filler.

Aspect 22: The polymer composition of any of aspects 1-21, wherein the polymer composition is capable of being activated by a laser.

Aspect 23: The polymer composition of any of aspects 16-22, wherein the polymer composition is capable of being molded into an article.

Aspect 24: The polymer composition of any of aspects 16-23, wherein the polymer composition demonstrates a flexural modulus in an amount equal to or greater than 3 GPa.

Aspect 25: The polymer composition of any of aspects 16-24, wherein the polymer composition demonstrates a tensile modulus in an amount equal to or greater than 3 GPa.

Aspect 26: A polymer composition comprising:
(a) a thermoplastic polymer; and
(b) a laser direct structuring additive,
  wherein the laser direct structuring additive comprises a mean particle size of equal to or less than 1 μm.

Aspect 27: a polymer composition comprising:
a) a first polycarbonate polymer;
b) a laser direct structuring additive,
  wherein the laser direct structuring additive comprises a mean particle size of equal to or less than 1 μm; and
c) an impact modifier component.

Aspect 28: The polymer composition according to aspect 27, wherein the impact modifier component is present in an amount from about 10 wt % to about 25 wt %.

Aspect 29: The polymer composition according to any of aspects 27-28, wherein the impact modifier component comprises one or more of an acrylonitrile butadiene styrene ("ABS") copolymer, a methacrylate butadiene styrene ("MBS") copolymer, and a bulk polymerized ABS ("BABS") copolymer.

Aspect 30: The polymer composition according to any of aspects 27-29, wherein the impact modifier component is a bulk polymerized ABS copolymer.

Aspect 31: The polymer composition according to any of aspects 29-30, wherein the bulk polymerized ABS copolymer is present in an amount from about 10 wt % to about 25 wt %.

Aspect 32: The polymer composition according to any of aspects 29-30, wherein the bulk polymerized ABS copolymer has a butadiene content of from about 13 wt % to about 18 wt %.

Aspect 33: The polymer composition according to any of aspects 27-28, wherein the impact modifier component is a methacrylate butadiene styrene copolymer.

Aspect 34: The polymer composition according to any of aspects 27-28, wherein the impact modifier component is an acrylonitrile butadiene styrene copolymer.

Aspect 35: The polymer composition according to any one of aspects 27-34, wherein the polymer composition further comprises a polycarbonate-polysiloxane copolymer.

Aspect 36: The polymer composition according to any one of aspects 27-35, wherein the polymer composition further comprises a second polycarbonate polymer.

Aspect 37: The polymer composition according to aspect 36, wherein the second polycarbonate polymer comprises a branched polycarbonate.

Aspect 38: The polymer composition according to any one of aspects 27-37, wherein the polymer composition further comprises a supporting material.

Aspect 39: The polymer composition according to aspect 38, wherein the supporting material acts as a carrier or improves the performance of the polymer composition, or a combination thereof.

Aspect 40: The polymer composition according to any one of aspects 27-39, wherein the polymer composition further comprises a flame retardant additive.

Aspect 41: The polymer composition according to aspect 40, wherein the flame retardant additive comprises BPADP or phosphazene, or a combination thereof.

Aspect 42: The polymer composition according to any one of aspects 27-41, wherein the polymer composition further comprises a reinforcing filler.

Aspect 43: The polymer composition according to aspect 41, wherein the reinforcing filler comprises a glass fiber, a carbon fiber, or a mineral filler, or a combination thereof.

Aspect 44: The polymer composition according to aspect 41, wherein the reinforcing filler is selected from the group consisting of a glass fiber, a carbon fiber, and a mineral filler.

Aspect 45: The polymer composition according to any one of aspects 27-44, wherein the polymer composition is capable of being activated by a laser.

Aspect 46: The polymer composition according to any one of aspects 27-45, wherein the polymer composition is capable of being molded into an article.

Aspect 47: The polymer composition according to any one of aspects 27-46, wherein the polymer composition demonstrates a flexural modulus in an amount equal to or greater than 3 GPa.

Aspect 48: The polymer composition according to any one of aspects 27-47, wherein the polymer composition demonstrates a tensile modulus in an amount equal to or greater than 3 GPa.

Aspect 49: A method for the manufacture of a polymer composition comprising the steps of:
(a) providing a first polycarbonate polymer;
(b) providing a laser direct structuring additive having a mean particle size of equal to or less than 1 μm; and
(c) combining the first polycarbonate polymer and laser direct structuring additive to form a polymer composition.

Aspect 50: The method according to aspect 49, wherein the polymer composition further comprises a polycarbonate-polysiloxane copolymer.

Aspect 51: The method according to any one of aspects 49-50, wherein the polymer composition further comprises a second polycarbonate polymer.

Aspect 52: The method according to aspect 51, wherein the second polycarbonate polymer comprises a branched polycarbonate.

Aspect 53: The method according to any one of aspects 49-52, wherein the polymer composition further comprises a supporting material.

Aspect 54: The method according to aspect 53, wherein the supporting material acts as a carrier or improves the performance of the polymer composition, or a combination thereof.

Aspect 55: The method according to any one of aspects 49-54, wherein the polymer composition further comprises a flame retardant additive.

Aspect 56: The method according to aspect 55, wherein the flame retardant additive comprises BPADP or phosphazene, or a combination thereof.

Aspect 57: The method according to any one of aspects 49-56, wherein the polymer composition further comprises a reinforcing filler.

Aspect 58: The method according to aspect 57, wherein the reinforcing filler comprises a glass fiber, a carbon fiber, or a mineral filler, or a combination thereof.

Aspect 59: The method according to any one of aspects 49-58, wherein the polymer composition is capable of being activated by a laser.

Aspect 60: The method according to any one of aspects 49-59, wherein the polymer composition is capable of being molded into an article.

Aspect 61: The method according to any one of aspects 49-60, wherein the polymer composition demonstrates a flexural modulus in an amount equal to or greater than 3 GPa.

Aspect 62: The method according to any one of aspects 49-60, wherein the polymer composition demonstrates a tensile modulus in an amount equal to or greater than 3 Gpa.

Aspect 63: A method for the manufacture of a polymer composition comprising the steps of:
(a) providing a polyamide polymer;
(b) providing a laser direct structuring additive having a mean particle size of equal to or less than 1 µm; and
(c) combining the polyamide polymer and laser direct structuring additive to form a polymer composition.

Aspect 64: The method according to aspect 63, wherein the polymer composition further comprises a flame retardant additive.

Aspect 65: The method according to aspect 64, wherein the flame retardant additive comprises Exolit OP.

Aspect 66: The method according to any one of aspects 63-65, wherein the polymer composition further comprises a reinforcing filler.

Aspect 67: The method according to aspect 66, wherein the reinforcing filler comprises a glass fiber, a carbon fiber, or a mineral filler, or a combination thereof.

Aspect 68: The method according to any one of aspects 63-67, wherein the polymer composition is capable of being activated by a laser.

Aspect 69: The method according to any one of aspects 63-68, wherein the polymer composition is capable of being molded into an article.

Aspect 70: The method according to any one of aspects 63-69, wherein the polymer composition demonstrates a flexural modulus in an amount equal to or greater than 3 GPa.

Aspect 71: The method according to any one of aspects 63-70, wherein the polymer composition demonstrates a tensile modulus in an amount equal to or greater than 3 Gpa.

Aspect 72: A method for the manufacture of a polymer composition comprising the steps of:
(a) providing a thermoplastic polymer;
(b) providing a laser direct structuring additive having a mean particle size of equal to or less than 1 µm; and
(c) combining the thermoplastic polymer and laser direct structuring additive to form a polymer composition.

Aspect 73: The method according to aspect 72, wherein the polymer composition further comprises a flame retardant additive.

Aspect 74: The method according to aspect 73, wherein the flame retardant additive comprises Exolit OP.

Aspect 75: The method according to aspect 73, wherein the flame retardant additive comprises BPADP or phosphazene, or a combination thereof.

Aspect 76: The method according to any one of aspects 72-75, wherein the polymer composition further comprises a supporting material.

Aspect 77: The method according to aspect 76, wherein the supporting material acts as a carrier or improves the performance of the polymer composition, or a combination thereof.

Aspect 78: The method according to any one of aspects 72-77, wherein the polymer composition further comprises a reinforcing filler.

Aspect 79: The method according to aspect 78, wherein the reinforcing filler comprises a glass fiber, a carbon fiber, or a mineral filler, or a combination thereof.

Aspect 80: The method according to any one of aspects 72-79, wherein the polymer composition is capable of being activated by a laser.

Aspect 81: The method according to any one of aspects 72-80, wherein the polymer composition is capable of being molded into an article.

Aspect 82: The method according to any one of aspects 72-81, wherein the polymer composition demonstrates a flexural modulus in an amount equal to or greater than 3 GPa.

Aspect 83: The method according to any one of aspects 72-82, wherein the polymer composition demonstrates a tensile modulus in an amount equal to or greater than 3 Gpa.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.

General Materials and Methods

For the non-limiting Examples described herein below, sample compositions were prepared from the components described in Table 1 below. The Example compositions (labeled as "Example 1," "Example 2," and the like) and various comparator samples (labeled as "Comp. 1," "Comp. 2," and the like) are further described herein. Molded articles were prepared for analysis.

Heat deflection temperature was determined per ISO 75 with flatwise specimen orientation with specimen dimensions of 80 mm×10 mm×4 mm. Data were collected using a Ceast HDT VICAT instrument and are provided below in units of ° C.

The notched Izod impact ("NII") test was carried out on 80 mm×10 mm×4 mm molded samples (bars) according to ISO180 at 23° C. Test samples were conditioned in ASTM standard conditions of 23° C. and 55% relative humidity for 48 hours and then were evaluated. NII was determined using a Ceast Impact Tester.

Flexural properties (modulus and strength) were measured using 3.2 mm bars in accordance with ISO 178. Flexural strength (in units of MPa) and flexural modulus (in units of GPa) are reported at yield.

Melt volume-flow rate ("MVR") was determined according to standard ISO 1133 under the following test conditions: 300° C./1.2 kg load/1080 sec dwell time or 300° C./1.2 kg load/360 sec dwell time. Data below are provided for MVR in $cm^3/10$ min.

Tensile properties (modulus, strength, and strength at yield) were measured on 3.2 mm bars in accordance with ISO 527 using sample bars prepared in accordance with ISO 3167 Type 1A multipurpose specimen standards. Tensile strength (for either at break or at yield, in units of MPa), tensile modulus (ion units of GPa), and tensile elongation (%) are reported at break.

The composites with a combination of thermally conductive properties and Laser Direct Structuring (LDS) function were prepared from twin screw extrusion. The composites were then evaluated of their LDS plating and peel performance, mechanical performance.

The polycarbonate used was Lexan Bisphenol A polycarbonate, ranging in molecular weight from 18,000 to 40,000 on an absolute PC molecular weight scale. It may be made by either the interfacial process, the melt process, or by an improved melt process.

The polycarbonate siloxane copolymer used comprises about 20% by weight of siloxane, 80% by weight BPA and endcapped with paracumyl phenol.

The laser activatable additives used were selected from a heavy metal mixture oxide spinel, a copper salt, or a combination including at least one of the foregoing laser direct structuring additives. Comparison of two kinds of LDS additives: general and nano-size LDS additives:

| Additive Description | Material Name | Mean Particle Size, microns |
|---|---|---|
| General LDS additive | Black 1G | 1.5 |
| Nano-size LDS additive | Black 30C965 | 0.6 |

These formulations all contain primary antioxidant and secondary antioxidants that are well known to those known in the arts.

All samples were prepared by melt extrusion on a Toshiba Twin screw extruder, using different melt temperature and RPM according to different base resin.

Tests were all conducted in accordance with ASTM, ISO standards, referenced in each test in Table 1 below.

TABLE 1

| Test Standards | |
|---|---|
| Test | Standard |
| Density | ISO 1183 |
| IZOD ASTM, 23° C. | ASTM D 256 |
| Tensile testing, 5 mm/min | ASTM D638 |
| Flexural testing, 1.27 mm/min | ASTM D790 |
| HDT, 1.82 MPa, 3.2 mm thickness bar | ASTM D 648 |

Hereinbelow are listed the process details, formulation and composite performance.

Table 2 lists the compounding profile and equipment set up. Table 3 lists the molding profile.

TABLE 2

| Compounding profile of polycarbonate composites. | | |
|---|---|---|
| Parameters | Unit | Value |
| Compounder Type | None | TEM-37BS |
| Barrel Size | mm | 1500 |
| Die | mm | 3 |
| Zone 1 Temp | ° C. | 250 |
| Zone 2 Temp | ° C. | 250 |
| Zone 3 Temp | ° C. | 250 |
| Zone 4 Temp | ° C. | 250 |
| Zone 5 Temp | ° C. | 260 |
| Zone 6 Temp | ° C. | 260 |
| Zone 7 Temp | ° C. | 260 |
| Zone 8 Temp | ° C. | 260 |
| Zone 9 Temp | ° C. | 260 |
| Zone 10 Temp | ° C. | 260 |
| Zone 11 Temp | ° C. | 260 |
| Zone 12 Temp | ° C. | 260 |
| Die Temp | ° C. | 260 |
| Screw Speed | rpm | 300 |
| Throughput | kg/hr | 25 |
| Vacuum 1 | MPa | −0.08 |

TABLE 3

| Molding profile of polycarbonate composites. | | |
|---|---|---|
| Parameters | Unit | Value |
| Pre-drying time | Hour | 3 |
| Pre-drying temp | ° C. | 100 |
| Hopper temp | ° C. | 70 |
| Zone 1 temp | ° C. | 270 |
| Zone 2 temp | ° C. | 280 |
| Zone 3 temp | ° C. | 285 |
| Nozzle temp | ° C. | 285 |
| Mold temp | ° C. | 80 |
| Screw speed | rpm | 80 |
| Back pressure | $kgf/cm^2$ | 30 |
| Cooling time | s | 20 |
| Injection speed | mm/s | 100 |
| Holding pressure | $kgf/cm^2$ | 800 |
| Max. Injection | $kgf/cm^2$ | 1200 |

If there is no LDS additive in the composition, the composition can't be plated after laser etching. With the addition of certain amount of an LDS additive, the composition can be plated after laser etching. A comparison of the efficiency of plating, as measured by plating index was performed using a standard LDS additive (Shepherd Black 1G) at 4% and 6% loadings, and a mean nano-sized particle LDS additive (BLACK 30C965) at 4% loading. The results show that the plating of the mean nano-sized particle LDS additive at 4% loading was superior, with a plating index of 0.95, compared to the standard LDS additive with a plating index of 0.62 at 4% and 0.75 at 6% loading. This difference in plating index can be seen in FIG. 1.

Three compositions were prepared each containing either a standard (Shepherd Black 1G) or a mean nano-sized particle (BLACK 30C965) LDS additive. The formulations and performance results are shown in Table 4 and Table 5, respectively. The results indicate that loading of a standard LDS additive (Shepard Black 1G) from 4 wt % to 6 wt %, led to an obvious lower impact strength, from 830 J/m to 807 J/m. Loading 4 wt % of nano-LDS additive into the PC matrix, however, showed a much improved performance to 870 J/m without sacrificing other physical properties, such as impact strength of sample as measured by ASTM standard testing methods.

TABLE 4

Formulation comparison of polycarbonates containing LDS additives of various mean particle sizes.

| S. No | Item Code | Item Description | Unit | #1 | #2 | #3 |
|---|---|---|---|---|---|---|
| 1 | C017 | PCP 1300, CAS: 111211-39-3 | % | 38.46 | 37.46 | 38.46 |
| 2 | C023A | 100 GRADE PCP, CAS: 111211-39-3 | % | 38.46 | 37.46 | 38.46 |
| 3 | C9030P | 20% PC/SILOXANE COPOLYMER, PCP ENDCAPPED, CAS: 202483-49-6 | % | 10 | 10 | 10 |
| 4 | C9030T | Transparent PC-Siloxane Co-polymer, CAS: 156064-99-2 | % | 5 | 5 | 5 |
| 5 | F594825 | Shepherd Black 1G, CAS: 68186-91-4 | % | 4 | 6 | |
| 6 | F594827 | BLACK 30C965 | % | | | 4 |
| 7 | F502815 | Fine Talc, CAS: 14807-96-6, 1318-59-8, 14808-60-7, 16389-88-1 | % | 3 | 3 | 3 |
| 8 | | Other additives | % | 1.08 | 1.08 | 1.08 |
| | | Formulation Total | | 100 | 100 | 100 |

TABLE 5

Performance comparison of polycarbonates containing LDS additives of various mean particle sizes.

| Test Property, parameters | Unit | #1 | #2 | #3 |
|---|---|---|---|---|
| Ash content | % | 6.84 | 7.98 | 6.735 |
| MVR, 300 C., 1.2 Kg, 360 s | cm$^3$/10 min | 12.6 | 12.8 | 13.4 |
| MVR, 300 C., 1.2 Kg, 1080 s | cm$^3$/10 min | 19.8 | 35.8 | 30.3 |
| Density | g/cm$^3$ | 1.2417 | 1.2605 | 1.2411 |
| Notched Impact Strength, 23 C. | J/m | 830 | 807 | 870 |
| HDT, 1.82 MPa, 3.2 mm | ° C. | 124 | 123 | 124 |
| Flexural Modulus | MPa | 2380 | 2470 | 2410 |
| Flexural Stress@Yield | MPa | 89.3 | 90 | 89.6 |
| Modulus of Elasticity | MPa | 2414 | 2525 | 2419.4 |
| Stress at Yield | MPa | 57.9 | 58 | 58 |
| Stress at Break | MPa | 52.5 | 53 | 52 |
| Elongation at Yield | % | 5.6 | 5 | 5.48 |
| Elongation at Break | % | 71.56 | 70 | 71.96 |

Additional compositions were prepared containing either a standard (Shepherd Black 1G) or a mean nano-sized particle (BLACK 30C965) LDS additive. Table 6 lists the compounding profile and equipment set up of glass filled polyamide composites. Table 7 lists the molding profile of glass filled polyamide composites. Table 8 and Table 9 lists formulation and performance comparisons of glass filled polyamide composites containing LDS additives with various mean particle sizes.

TABLE 6

Compounding profile of glass filled polyamide composites.

| Parameters | Unit | Glass filled, LDS capable polyamide |
|---|---|---|
| Compounder Type | NONE | TEM-37BS |
| Barrel Size | mm | 1500 |
| Die | mm | 3 |
| Feed (Zone 0) Temp | NONE | 50 |
| Zone 1 Temp | ° C. | 100 |
| Zone 2 Temp | ° C. | 150 |
| Zone 3 Temp | ° C. | 200 |
| Zone 4 Temp | ° C. | 255 |
| Zone 5 Temp | ° C. | 255 |
| Zone 6 Temp | ° C. | 255 |
| Zone 7 Temp | ° C. | 255 |
| Zone 8 Temp | ° C. | 255 |
| Zone 9 Temp | ° C. | 255 |
| Zone 10 Temp | ° C. | 255 |
| Zone 11 Temp | ° C. | 255 |
| Die Temp | ° C. | 260 |
| Screw speed | rpm | 350 |
| Throughput | kg/hr | 50 |
| Torque | NONE | 65 |
| Vacuum 1 | MPa | −0.08 |
| Side Feeder 1 speed | rpm | 300 |
| Melt temperature | NONE | 260 |

TABLE 7

Molding profile of glass filled polyamide composites.

| Parameters | Unit | Glass filled, LDS capable polyamide |
|---|---|---|
| Cnd: Pre-drying time | Hour | 4 |
| Cnd: Pre-drying temp | ° C. | 120 |
| Molding Machine | NONE | FANUC/UH110 |
| Mold Type (insert) | NONE | ASTM tensile, ASTM flexual, ASTM Izod, Colorchip, UL |
| Hopper temp | ° C. | 50 |
| Zone 1 temp | ° C. | 270-280 |
| Zone 2 temp | ° C. | 275-285 |
| Zone 3 temp | ° C. | 280-300 |
| Nozzle temp | ° C. | 280-300 |
| Mold temp | ° C. | 80-120 |
| Screw speed | rpm | 100 |
| Back pressure | kgf/cm$^2$ | 30-50 |
| Cooling time | s | 15 |
| Injection speed | mm/s | 50-150 |
| Holding pressure | kgf/cm$^2$ | 600-800 |
| Max. Injection pressure | kgf/cm$^2$ | 1000 |

TABLE 8

Formulation comparison of glass-filled polyamide composites containing LDS additives of various mean particle sizes.

| Item Code | Item Description | Unit | NPI-12-03154-1 | NPI-12-03154-2 | NPI-12-03154-3 |
|---|---|---|---|---|---|
| 83404 | PA66 Regular-NV | % | 46.5 | 46.5 | 46.5 |
| G512950 | Nittobo (flat)glass fiber CSG3PA820 | % | 50 | 50 | 50 |
| V-7709 | V-7709 from FERRO | % | | | 3 |
| F594825 | Shepherd Black 1G | % | 3 | | |
| F594827 | BLACK 30C965 | % | | 3 | |
| Other Additive | | | 0.5 | 0.5 | 0.5 |
| Notched Impact Strength, 23 C. | | J/m | 834 | 867 | |
| HDT, 1.82 MPa, 3.2 mm | | ° C. | 108 | 108 | |
| Flexural Modulus | | MPa | 2300 | 2300 | |
| Flexural Stress@Yield | | MPa | 79 | 79 | |
| Modulus of Elasticity | | MPa | 2561 | 2552 | |
| Stress at Yield | | MPa | 52 | 52 | |
| Stress at Break | | MPa | 30 | 26 | |
| Elongation at Yield | | % | 4 | 5 | |
| Elongation at Break | | % | 35 | 35 | |
| Plating index | | | 0.9 | 1.1 | |

TABLE 9

Performance comparison of glass-filled polyamide composites containing LDS additives of various mean particle sizes.

| Typical Property | Test Method | Test Description | Unit | NPI-12-03154-1 | NPI-12-03154-2 | NPI-12-03154-3 |
|---|---|---|---|---|---|---|
| ASH | ASTM D 5630 | 2.0 g, 900 C., >20 min | % | 52.39 | 52.21 | 52.2 |
| Density | ASTM D 792 | | | 1.6242 | 1.6217 | 1.6267 |
| MVR | ASTM D 1238 | 280° C./2.16 kg/360 s | cm³/10 min | 17.8 | 18 | 20.4 |
| HDT | ASTM D 648 | 0.45 MPa/3.2 mm | ° C. | 260 | 259 | 261 |
| Flexual Modulus | ASTM D 790 | 3.2 mm, 1.27 mm/min | MPa | 13800 | 13800 | 14000 |
| Flexural Strength | ASTM D 790 | yield, 3.2 mm, 1.27 mm/min | MPa | 260 | 261 | 258 |
| Tensile Modulus | ASTM D 638 | 5 mm/min | MPa | 15664.4 | 15681 | 15620 |
| Tensile Strength | ASTM D 638 | break, 5 mm/min | MPa | 174.6 | 177.4 | 172 |
| Tensile Elongation | ASTM D 638 | break, 5 mm/min | % | 2.1 | 2.1 | 2.05 |
| Notched IZOD | ASTM D256 | 23° C., 2 lbf/ft | J/m | 71.9 | 68.5 | 70.3 |
| Unnotched IZOD | ASTM D256 | 23° C., 5 lbf/ft | J/m | 710 | 668 | 655 |
| Dk | 1.1 GHz | | | 4.167 | 4.153 | 4.120 |
| Df | 1.1 GHz | | | 0.012 | 0.014 | 0.013 |
| PI | | | | 0.7 | | |

Additional compositions were prepared containing 10 wt % of general and nano-size copper chromium oxide spinel added in PC/ABS blends. Table 10 lists formulation and performance comparisons of copper chromium oxide spinel and polycarbonate composites containing LDS additives with various mean particle sizes. Table 10 illustrates that with the same loading of general and nano-LDS additive added, properties such as flow, high impact strength, and other physical properties were relatively balanced, while plating index has an increase from about 0.9 of general LDS additive to about 1.1 of nano-LDS additive, which indicates notable improvement in plating performance.

| | | | | | |
|---|---|---|---|---|---|
| 1 | C29449 | Bulk ABS Building Block C29449 | % | 15.37 | 15.37 |
| 2 | C023A | 100 GRADE PCP | % | 29.5 | 29.5 |
| 3 | C017 | PCP 1300 | % | 29.5 | 29.5 |
| 4 | F5108B | MBS POWDER-Stabilized | % | 6 | 6 |
| 5 | C29355 | SAN | % | 4.78 | 4.78 |
| 6 | F594825 | Shepherd Black 1 G | % | 10 | |
| 7 | F594827 | BLACK 30C965 | % | | 10 |
| 8 | F503674 | surface modified talc from Luzenac, supplier proprietary surface modifier | % | 3 | 3 |
| 9 | | Other additives | % | 1.85 | 1.85 |
| | | Formulation Total | | 100 | 100 |
| | | MVR, 260 C., 5 Kg, 360 s | cm³/10 min | 13.8 | 14.3 |
| | | MVR, 260 C., 5 Kg, 1080 s | cm³/10 min | 13.6 | 18.5 |
| | | Density | g/cm3 | 1.25 | 1.25 |
| | | Specific Gravity | g/cm3 | 1.25 | 1.25 |

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A polymer composition for use in a laser direct structuring process comprising:
   a first polycarbonate polymer;
   a copper chromium oxide laser directed structuring additive; and,
   an impact modifier component in an amount of from about 10 wt % to about 25 wt %;
   wherein the laser direct structuring additive comprises a mean particle size of equal to or less than 1 μm in an amount of greater than 0 wt % to 15 wt %, and
   wherein the impact modifier is acrylonitrile butadiene styrene (ABS), methacrylate butadiene styrene (MBS), polycarbonate-siloxane copolymer, or a combination thereof; and, wherein the composition does not include titanium dioxide.

2. The polymer composition according to claim 1, wherein the polymer composition further comprises a polycarbonate-polysiloxane copolymer.

3. The polymer composition according to any one of claims 1-2, wherein the polymer composition further comprises a second polycarbonate polymer.

4. The polymer composition according to claim 3, wherein the second polycarbonate polymer comprises a branched polycarbonate.

5. The polymer composition according to claim 1, wherein the polymer composition further comprises a flame retardant additive.

6. The polymer composition according to claim 5, wherein the flame retardant additive comprises BPADP or phosphazene, or a combination thereof.

7. The polymer composition according to claim 1, wherein the polymer composition further comprises a reinforcing filler.

8. The polymer composition according to claim 7, wherein the reinforcing filler comprises a glass fiber, a carbon fiber, or a mineral filler, or a combination thereof.

9. The polymer composition according to claim 1, wherein the impact modifier component comprises one or more of an acrylonitrile butadiene styrene ("ABS") copolymer, a methacrylate butadiene styrene ("MBS") copolymer, and a bulk polymerized ABS ("BABS") copolymer.

10. The polymer composition according to claim 9, wherein the impact modifier component is the bulk polymerized ABS copolymer.

11. The polymer composition according to claim 10, wherein the bulk polymerized ABS copolymer is present in an amount from about 10 wt % to about 25 wt %.

12. The polymer composition according to claim 10, wherein the bulk polymerized ABS copolymer has a butadiene content of from about 13 wt % to about 18 wt %.

13. The polymer composition according to claim 9, wherein the impact modifier component is the methacrylate butadiene styrene copolymer.

14. The polymer composition according to claim 9, wherein the impact modifier component is the acrylonitrile butadiene styrene copolymer.

15. A method for the manufacture of an article comprising molding an article from the composition of claim 1,
exposing the LDS additive to a laser to form an activated area, and
plating a metal layer onto the activated area.

16. The method according to claim 15, wherein the polymer composition further comprises a polycarbonate-polysiloxane copolymer.

17. The method according to claim 16, wherein the polymer composition further comprises a second polycarbonate polymer.

18. The method according to claim 17, wherein the second polycarbonate polymer comprises a branched polycarbonate.

19. The method according to claim 15, wherein the polymer composition further comprises a second polycarbonate polymer.

20. The method according to claim 19, wherein the second polycarbonate polymer comprises a branched polycarbonate.

21. The method according to claim 15, wherein the polymer composition further comprises a flame retardant additive.

22. The method according to claim 21, wherein the flame retardant additive comprises BPADP or phosphazene, or a combination thereof.

23. An article comprising
the polymer composition of claim 1,
a laser activated area, and
a metal layer plated on the laser activated area.

24. The polymer composition according to claim 1, wherein the laser direct structuring additive consists of a copper chromium oxide.

25. The polymer composition according to claim 1, wherein:
the first polycarbonate polymer is a bisphenol A polycarbonate, ranging in molecular weight from 15,000 to 40,000 on weight average molecular weight;
the polymer composition further comprises a second polycarbonate polymer, and wherein the second polycarbonate polymer is a branched polycarbonate polymer;
and,
the laser direct structuring additive comprises a mean particle size of equal to or less than 0.6 µm.

* * * * *